United States Patent
Xiao et al.

(10) Patent No.: US 9,999,049 B2
(45) Date of Patent: Jun. 12, 2018

(54) AVOIDING UNNECESSARY PROTOCOL DATA UNIT (PDU) TRANSMISSIONS

(71) Applicant: QUALCOMM Incorporated, San Diego, CA (US)

(72) Inventors: Gang Andy Xiao, San Diego, CA (US); Shailesh Maheshwari, San Diego, CA (US); Aziz Gholmieh, Del Mar, CA (US); Feilu Liu, San Diego, CA (US); Saket Bathwal, Hyderabad (IN); Rudhir Upretee, San Diego, CA (US); Bao Vinh Nguyen, San Diego, CA (US); Haiqin Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 15/224,272

(22) Filed: Jul. 29, 2016

(65) Prior Publication Data

US 2017/0064707 A1    Mar. 2, 2017

Related U.S. Application Data

(60) Provisional application No. 62/212,301, filed on Aug. 31, 2015.

(51) Int. Cl.
*H04L 1/18* (2006.01)
*H04W 72/04* (2009.01)
(Continued)

(52) U.S. Cl.
CPC ......... *H04W 72/0446* (2013.01); *H04L 1/188* (2013.01); *H04L 1/1883* (2013.01);
(Continued)

(58) Field of Classification Search
CPC ......... H04L 1/00; H04L 1/188; H04L 1/1883; H04L 47/14; H04L 47/19; H04L 69/16;
(Continued)

(56) References Cited

U.S. PATENT DOCUMENTS 7,911,969 B2    3/2011    Fischer
8,125,994 B2    2/2012    Reddy
(Continued)

FOREIGN PATENT DOCUMENTS

EP    1 811 727 A2    7/2007
WO    WO-02/091659 A2    11/2002
(Continued)

OTHER PUBLICATIONS

International Search Report and Written Opinion—PCT/US2016/044971—ISA/EPO—dated Dec. 6, 2016. 13 pages.

*Primary Examiner* — Mohamed Kamara
(74) *Attorney, Agent, or Firm* — Dalei Dong; Arent Fox, LLP

(57) ABSTRACT

Aspects described herein relate to wireless communications. Protocol data units (PDUs) can be received at a network layer from one or more transmitting nodes using a link associated with each respective transmitting node. One or more missing PDUs can be detected based, at least in part, on sequence numbers of the received PDUs. A timer can be started based on the detection of the one or more missing PDUs. In response to expiration of the timer, and without receiving the one or more missing PDUs before the expiration of the timer, a lower network layer can be notified that the one or more missing PDUs are received to prevent attempted transmitting/retransmitting or other processing of the one or more missing PDUs.

30 Claims, 15 Drawing Sheets

(51) Int. Cl.
   *H04L 29/06* (2006.01)
   *H04L 12/801* (2013.01)
   *H04L 29/08* (2006.01)
(52) U.S. Cl.
   CPC .............. *H04L 47/14* (2013.01); *H04L 47/19* (2013.01); *H04L 69/16* (2013.01); *H04L 69/321* (2013.01); *H04W 76/11* (2018.02)
(58) Field of Classification Search
   CPC .. H04L 69/321; H04W 72/0446; H04W 76/11
   See application file for complete search history.

(56) References Cited

U.S. PATENT DOCUMENTS

| | | | |
|---|---|---|---|
| 8,355,331 | B2 | 1/2013 | Chun et al. |
| 2003/0210669 | A1* | 11/2003 | Vayanos ............... H04L 1/1845 370/335 |
| 2008/0219204 | A1* | 9/2008 | Lee ....................... H04L 1/1812 370/315 |
| 2009/0168723 | A1 | 7/2009 | Meylan |
| 2009/0213729 | A1* | 8/2009 | Zhang ................... H04L 1/1607 370/216 |
| 2009/0268683 | A1* | 10/2009 | Ho ........................ H04L 1/1628 370/329 |
| 2014/0301188 | A1 | 10/2014 | Koskinen |
| 2014/0301362 | A1 | 10/2014 | Koskinen |
| 2015/0117176 | A1* | 4/2015 | Jeon ...................... H04L 49/552 370/216 |

FOREIGN PATENT DOCUMENTS

| | | |
|---|---|---|
| WO | WO-2008/133577 A1 | 11/2008 |
| WO | WO-2009/045945 A2 | 4/2009 |
| WO | WO-2009/088342 A1 | 7/2009 |
| WO | WO-2015/018653 A1 | 2/2015 |

* cited by examiner

US 9,999,049 B2

AVOIDING UNNECESSARY PROTOCOL DATA UNIT (PDU) TRANSMISSIONS

CROSS-REFERENCE TO RELATED APPLICATIONS

The present Application for Patent claims priority to Provisional Application No. 62/212,301 entitled "AVOIDING UNNECESSARY PACKET DATA CONVERGENCE PROTOCOL (PDCP) PROTOCOL DATA UNIT (PDU) TRANSMISSIONS" filed Aug. 31, 2015, which is assigned to the assignee hereof and hereby expressly incorporated by reference herein in its entirety for all purposes.

BACKGROUND

Field of the Disclosure

Aspects of the present disclosure relate generally to wireless communications systems, and more particularly, to avoiding unnecessary protocol data unit (PDU) transmissions, for example, based on a reorder timer expiring.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of eNodeBs (eNBs) that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

For example, in LTE, a UE can aggregate connections with a plurality of eNodeBs or other access points, using dual-connectivity (or multiple-connectivity) with multiple eNodeBs and/or related cells, traffic aggregation (e.g., radio access network (RAN) aggregation or other network level aggregation) with one or more eNodeBs and one or more other types of access points (e.g., a WiFi hotspot). The UE can receive protocol data units (PDU) over the connections at one or more network layers, and can order the PDUs based on a sequence number. A PDCP timer can be initialized to manage cases where a PDU may not be received. Based on a determined expiration of the PDCP timer without receiving the PDU, all service data units (SDU) received for a PDU (e.g., at a lower network layer) are flushed to the network layer (e.g., provided to the network layer and deleted from the lower network layer memory). In some cases, however, the missing SDUs may still be transmitted to the UE though the UE has given up on receiving the PDU at the network layer, and discards the SDUs received at the lower network layer when/if subsequently received.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

In an aspect, a method for wireless communications is provided. The method may include receiving protocol data units (PDUs) at a network layer from one or more transmitting nodes using a link associated with each respective transmitting node, detecting one or more missing PDUs based, at least in part, on sequence numbers of the received PDUs, and starting a timer based on the detection of the one or more missing PDUs. The method may also include, in response to expiration of the timer, and without receiving the one or more missing PDUs before the expiration of the timer, notifying a lower network layer that the one or more missing PDUs are received.

The method may include where notifying to the lower network layer comprises acknowledging receipt of the one or more missing PDUs to the lower network layer. The method may also include where notifying to the lower network layer comprises transmitting a lower network layer status message to the transmitting node to prevent the transmitting node transmitting lower network layer PDUs corresponding to the one or more missing PDUs. The method may also include where notifying to the lower network layer comprises notifying to a plurality of lower network layers, wherein each of the plurality of lower network layers corresponds to the link associated with each respective transmitting node. Further, the method may include where the one or more missing PDUs are PDCP PDUs, and wherein the lower network layer is a radio link control (RLC) layer. The method may also include where the one or more missing PDUs are transmission control protocol (TCP), internet protocol (IP), TCP/IP, or user datagram protocol (UDP) PDUs, and wherein the lower network layer is a PDCP layer or a RLC layer. Further, the method may include transmitting, to the one or more transmitting nodes, a status message formed at the network layer that receives data from each link associated with each respective transmitting node, where the status message includes an indication of a first missing sequence (FMS), where the FMS is selected to prevent transmission of the one or more missing PDUs by the one or more transmitting nodes.

In an aspect, an apparatus for wireless communication by a user equipment (UE), is provided. The apparatus includes a transceiver, a memory, and at least one processor communicatively coupled with the transceiver and the memory. The at least one processor is configured to receive PDUs at a network layer from one or more transmitting nodes using a link associated with each respective transmitting node, detect one or more missing PDUs based, at least in part, on sequence numbers of the received PDUs, and start a timer based on the detection of the one or more missing PDUs. The at least one processor is further configured to, in response to expiration of the timer, and without receiving the one or more missing PDUs before the expiration of the timer, notify a lower network layer that the one or more missing PDUs are received.

The apparatus may include where the at least one processor is configured to notify to the lower network layer at least in part by acknowledging receipt of the one or more missing PDUs to the lower network layer. The apparatus may also include where the at least one processor is configured to notify to the lower network layer at least in part by transmitting a lower network layer status message to the transmitting node to prevent the transmitting node transmitting lower network layer PDUs corresponding to the one or more missing PDUs. Further, the apparatus may include where the at least one processor is configured to notify to the lower network layer at least in part by notifying to a plurality of lower network layers, where each of the plurality of lower network layers corresponds to the link associated with each respective transmitting node. The apparatus may additionally include where the one or more missing PDUs are PDCP PDUs, and wherein the lower network layer is a RLC layer. Also, the apparatus may include where the one or more missing PDUs are TCP, internet protocol IP, TCP/IP, or UDP PDUs, and where the lower network layer is a PDCP layer or a RLC layer. The apparatus may further include where the at least one processor is further configured to transmit, to the one or more transmitting nodes, a status message formed at the network layer that receives data from each link associated with each respective transmitting node, where the status message includes an indication of a FMS, where the FMS is selected to prevent transmission of the one or more missing PDUs by the one or more transmitting nodes. Additionally, the apparatus may include one or more antennas coupled to the transceiver and configured to at least one of transmit one or more wireless signals to the transmitting node or receive one or more wireless signals from the transmitting node.

In an aspect, an apparatus for wireless communication by a UE is provided. The apparatus includes means for receiving PDUs at a network layer from one or more transmitting nodes using a link associated with each respective transmitting node, means for detecting one or more missing PDUs based, at least in part, on sequence numbers of the received PDUs, and means for starting a timer based on the detection of the one or more missing PDUs. The apparatus also includes means for, in response to expiration of the timer, and without receiving the one or more missing PDUs before the expiration of the timer, notifying a lower network layer that the one or more missing PDUs are received.

The apparatus may include where the means for notifying notifies to the lower network layer at least in part by acknowledging receipt of the one or more missing PDUs to the lower network layer. The apparatus may also include where the means for notifying notifies to the lower network layer at least in part by transmitting a lower network layer status message to the transmitting node to prevent the transmitting node transmitting lower network layer PDUs corresponding to the one or more missing PDUs. Further, the apparatus may include where the means for notifying notifies to the lower network layer at least in part by notifying to a plurality of lower network layers, where each of the plurality of lower network layers corresponds to the link associated with each respective transmitting node. The apparatus may also include where the one or more missing PDUs are PDCP PDUs, and wherein the lower network layer is a RLC layer. The apparatus may also include where the one or more missing PDUs are TCP, IP, TCP/IP, or UDP PDUs, and wherein the lower network layer is a PDCP layer or a RLC layer. The apparatus may also include means for transmitting, to the one or more transmitting nodes, a status message formed at the network layer that receives data from each link associated with each respective transmitting node, wherein the status message includes an indication of a FMS, wherein the FMS is selected to prevent transmission of the one or more missing PDUs by the one or more transmitting nodes. Also, the apparatus may include where the means for receiving comprises one or more antennas coupled to a transceiver and configured to at least one of transmit one or more wireless signals to the transmitting node or receive one or more wireless signals from the transmitting node.

In an aspect, a computer-readable medium storing computer executable code for wireless communication by a UE is provided. The code includes code for receiving PDUs at a network layer from one or more transmitting nodes using a link associated with each respective transmitting node, code for detecting one or more missing PDUs based, at least in part, on sequence numbers of the received PDUs, code for starting a timer based on the detection of the one or more missing PDUs, and code for, in response to expiration of the timer, and without receiving the one or more missing PDUs before the expiration of the timer, notifying a lower network layer that the one or more missing PDUs are received.

The computer-readable medium may include where the code for notifying notifies to the lower network layer at least in part by acknowledging receipt of the one or more missing PDUs to the lower network layer. The computer-readable medium may also include where the code for notifying notifies to the lower network layer at least in part by transmitting a lower network layer status message to the transmitting node to prevent the transmitting node transmitting lower network layer PDUs corresponding to the one or more missing PDUs. The computer-readable medium also may include where the code for notifying notifies to the lower network layer at least in part by notifying to a plurality of lower network layers, where each of the plurality of lower network layers corresponds to the link associated with each respective transmitting node. The computer-readable medium may further include where the one or more missing PDUs are PDCP PDUs, and wherein the lower network layer is a RLC layer. The computer-readable medium may additionally include where the one or more missing PDUs are TCP, IP, TCP/IP, or UDP PDUs, and wherein the lower network layer is a PDCP layer or a RLC layer. The computer-readable medium may also include code for transmitting, to the one or more transmitting nodes, a status message formed at the network layer that receives data from each link associated with each respective transmitting node, where the status message includes an indication of a FMS, where the FMS is selected to prevent transmission of the one or more missing PDUs by the one or more transmitting nodes.

In another example, a method for wireless communication by a UE is provided. The method includes receiving PDCP PDUs from one or more eNBs using a link associated with each respective eNB, detecting one or more missing PDCP PDUs based, at least in part, on sequence numbers of the received PDCP PDUs, starting a timer based on the detection of the one or more missing PDCP PDUs, and in response to expiration of the timer without receiving the one or more missing PDCP PDUs before the expiration of the timer, taking one or more actions prevent transmission of the one or more missing PDCP PDUs by the one or more eNBs.

The method may also include where taking one or more actions comprises transmitting to the one or more eNBs, a status message with an indication of a first missing sequence selected to prevent transmission of the one or more missing PDCP PDUs by the one or more eNBs. The method may additionally include where the indication of the first missing sequence comprises an indication of a sequence number of the PDCP PDU having the highest sequence number. Additionally, the method may include where taking one or more actions comprises generating a status message acknowledging receipt of a PDCP PDU having a sequence number selected to prevent transmission of the one or more missing PDCP PDUs by the one or more eNBs. The method may also include where the status message acknowledges receipt of a PDCP PDU having a sequence number higher than that of any PDCP PDU received. Moreover, the method may include where generating the status message comprises performing payload inspection at a RLC layer to determine the sequence numbers of the received PDCP PDUs. Also, the method may include adjusting a receive state variable, and performing payload inspection at a RLC later to determine the sequence numbers of the received PDUs.

In another example, an apparatus for wireless communication by a UE is provided. The apparatus include means for receiving PDCP PDUs from one or more eNBs using a link associated with each respective eNB, means for detecting one or more missing PDCP PDUs based, at least in part, on sequence numbers of the received PDCP PDUs, means for starting a timer based on the detection of the one or more missing PDCP PDUs, and in response to expiration of the timer without receiving the one or more missing PDCP PDUs before the expiration of the timer, means for taking one or more actions prevent transmission of the one or more missing PDCP PDUs by the one or more eNBs.

The apparatus can also include where taking one or more actions comprises means for transmitting to the one or more eNBs, a status message with an indication of a first missing sequence selected to prevent transmission of the one or more missing PDCP PDUs by the one or more eNBs. The apparatus can also include where the indication of the first missing sequence comprises an indication of a sequence number of the PDCP PDU having the highest sequence number. Further, the apparatus may include where said means for taking one or more actions comprises means for generating a status message acknowledging receipt of a PDCP PDU having a sequence number selected to prevent transmission of the one or more missing PDCP PDUs by the one or more eNBs. Also, the apparatus may include where the status message acknowledges receipt of a PDCP PDU having a sequence number higher than that of any PDCP PDU received. Moreover, the apparatus may include where the means for generating the status message comprises means for performing payload inspection at a RLC layer to determine the sequence numbers of the received PDCP PDUs. Additionally the apparatus may include means for adjusting a receive state variable, and means for performing payload inspection at a RLC later to determine the sequence numbers of the received PDUs.

In a further example, an apparatus for wireless communication is provided that includes at least one processor configured to receive PDCP PDUs from one or more eNBs using a link associated with each respective eNB, detect one or more missing PDCP PDUs based, at least in part, on sequence numbers of the received PDCP PDUs, start a timer based on the detection of the one or more missing PDCP PDUs, and in response to expiration of the timer without receiving the one or more missing PDCP PDUs before the expiration of the timer, take one or more actions prevent transmission of the one or more missing PDCP PDUs by the one or more eNBs. The apparatus also include a memory coupled to the at least one processor.

In another example, a computer readable medium for wireless communications having instructions stored thereon is provided. The instructions are executable by one or more processors for receiving PDCP PDUs from one or more eNBs using a link associated with each respective eNB, detecting one or more missing PDCP PDUs based, at least in part, on sequence numbers of the received PDCP PDUs, starting a timer based on the detection of the one or more missing PDCP PDUs; and in response to expiration of the timer without receiving the one or more missing PDCP PDUs before the expiration of the timer, taking one or more actions prevent transmission of the one or more missing PDCP PDUs by the one or more eNBs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
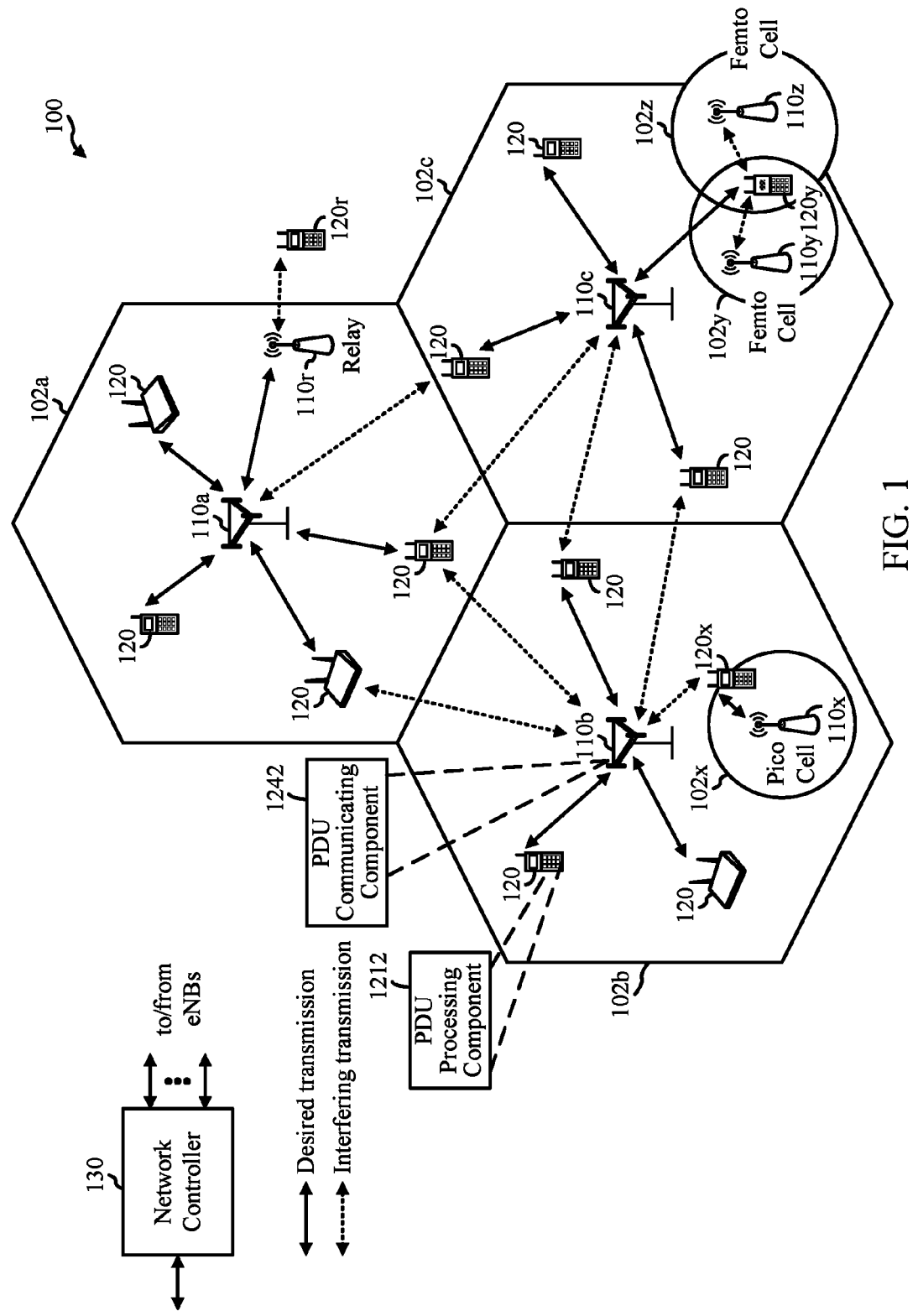
FIG. 1 is a block diagram conceptually illustrating an example telecommunications system, according to aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Aspects of the present disclosure provide apparatus, methods, processing systems, and computer program products for avoiding unnecessary protocol data unit (PDU) transmissions, for example, when a timer (e.g., a reorder timer) expires. For example, as described in further detail herein, a user equipment (UE) may identify one or more missing PDUs, for example, based on sequence numbers (SNs) associated with received PDUs. Upon detecting one or more missing PDUs, the UE may initialize the reorder timer for the one or more missing PDUs. According to an aspect, upon expiration of the reorder timer without first receiving the one or more missing PDUs, the UE may take one or more actions to prevent unnecessary transmission of the one or more missing PDUs. Though aspects described herein are generally in reference to a UE receiving PDU transmissions from an access point and detecting missing PDUs, substantially any receiving device can receive PDU transmissions from substantially any transmitting device accordingly detect missing PDUs, etc. Thus, for example, the receiving and transmitting devices may be an access point and UE, respectively, UEs communicating in peer-to-peer mode, etc.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 shows a wireless communication system 100 in which aspects of the present disclosure may be practiced. For example, as described herein, a UE 120 may track a time of receipt of PDUs on a per PDU basis and may take one or more actions to reorder the received PDUs based, at least in part, on the tracked time. For example, the UE 120 may include a PDU processing component 1212 for processing one or more received PDUs and/or taking actions for missing or reordered PDUs, as described further herein. Similarly, one or more evolved Node Bs (eNodeBs) 110 or other access points (e.g., WiFi hotspots) may include a PDU communicating component 1242 for communicating PDUs to the UE 120, as described further herein. The UE 120 may be a dual connected (DC) UE, wherein the UE consumes radio resources provided by at least two different eNBs, a UE using traffic aggregation (e.g., radio access network (RAN) aggregation) to communicate with one or more eNBs and/or other types of access points where PDUs can be aggregated at a RAN layer, and/or the like.

The system illustrated in FIG. 1 may be, for example, a long term evolution (LTE) network. The wireless communication system 100 may include one or more eNodeBs 110 and/or other network entities. An eNodeB may be a station that communicates with the UEs and may also be referred to as a base station, an access point, network entity, substantially any device that can receive and/or transmit communications to provide access in a wireless network, etc. A Node B is another example of a station that communicates with the UEs. For example, though eNodeBs 110 are generally described herein, substantially any access point (e.g. a WiFi hotspot) or wireless communication device can include a PDU communicating component 1242, as described herein. Similarly, though UEs 120 are generally described herein, substantially any wireless communication device can include a PDU processing component 1212, as described herein. In one example, an eNodeB 110 may additionally or alternatively include a PDU processing component 1212 for processing PDUs received from a UE 120, and the UE 120 may additionally or alternatively include a PDU communicating component 1242 for transmitting PDUs to the eNodeB 110.

Each eNodeB 110 may provide communication coverage for a particular geographic area. In 3GPP, the term "cell" can refer to a coverage area of an eNodeB and/or an eNodeB subsystem serving this coverage area, depending on the context in which the term is used.

An eNodeB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNodeB for a macro cell may be referred to as a macro eNodeB. An eNodeB for a pico cell may be referred to as a pico eNodeB. An eNodeB for a femto cell may be referred to as a femto eNodeB or a home eNodeB. In the example shown in FIG. 1, the eNodeBs 110a, 110b and 110c may be macro eNodeBs for the macro cells 102a, 102b and 102c, respectively. The eNodeB 110x may be a pico eNodeB for a pico cell 102x. The eNodeBs 110y and 110z may be femto eNodeBs for the femto cells 102y and 102z, respectively. An eNodeB may support one or multiple (e.g., three) cells.

The wireless communication system 100 may also include relay stations. A relay station is a station that receives a transmission of data and/or other information from an upstream station (e.g., an eNodeB or a UE) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless communication system 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless communication system 100. For example, macro eNodeBs may have a high transmit power level (e.g., 20 Watts) whereas pico eNodeBs, femto eNodeBs and relays may have a lower transmit power level (e.g., 1 Watt).

The wireless communication system 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for both synchronous and asynchronous operation.

A network controller 130 may couple to a set of eNodeBs and provide coordination and control for these eNodeBs. The network controller 130 may communicate with the eNodeBs 110 via a backhaul. The eNodeBs 110 may also communicate with one another, e.g., directly or indirectly via wireless or wireline backhaul.

The UEs 120 (e.g., 120x, 120y, etc.) may be dispersed throughout the wireless communication system 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro eNodeBs, pico eNodeBs, femto eNodeBs, relays, etc. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 2:
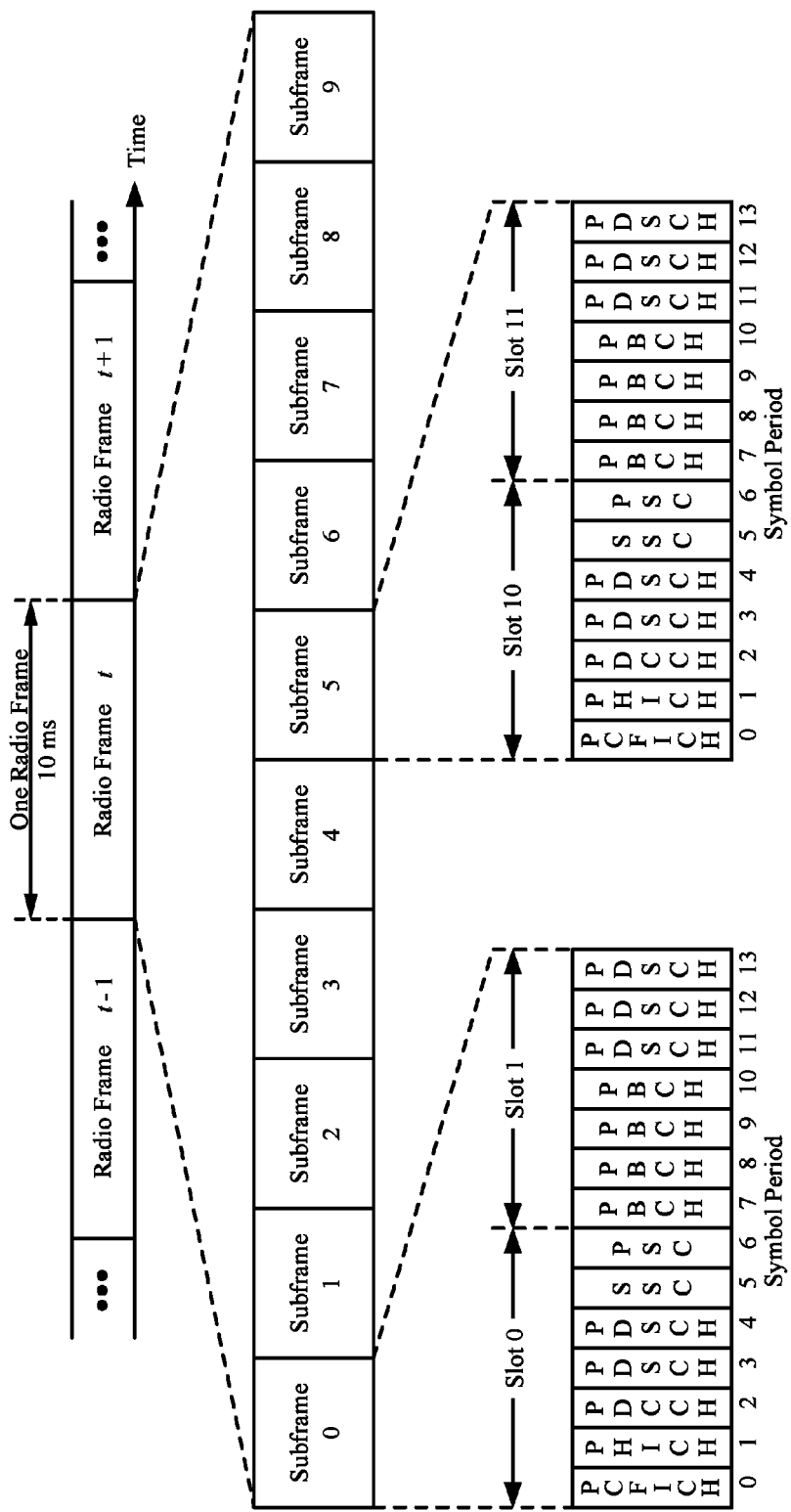
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The eNodeB may send a Physical Broadcast Channel (PBCH) in symbol periods 0 to 3 in slot 1 of sub-frame 0. The PBCH may carry certain system information.

The eNodeB may send a Physical Control Format Indicator Channel (PCFICH) in a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNodeB may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
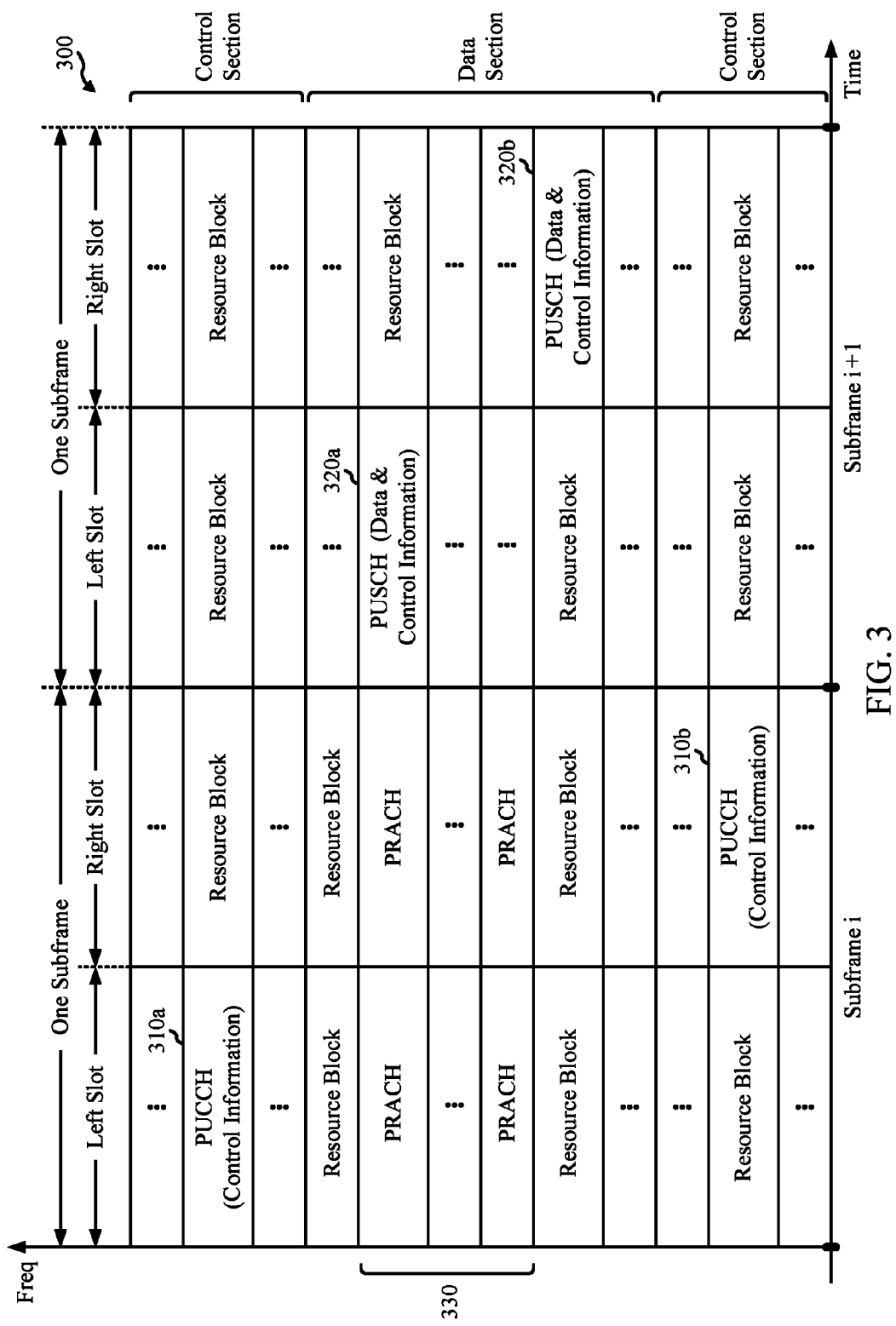
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310a, 310b in the control section to transmit control information to an eNB. The UE may also be assigned resource blocks 320a, 320b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
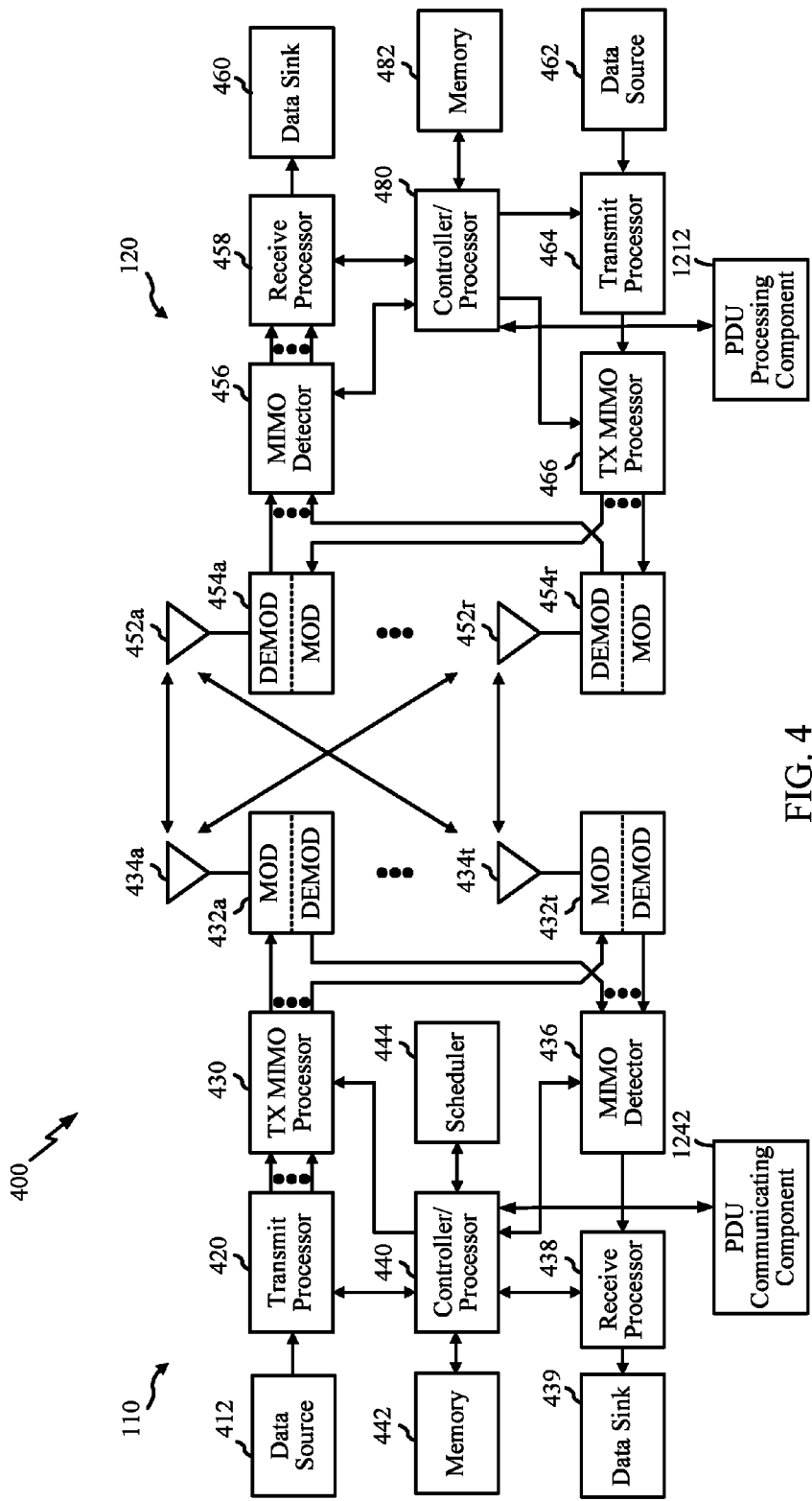
FIG. 4 is a block diagram conceptually illustrating a design of an example eNodeB and user equipment (UE), according to aspects of the present disclosure.

FIG. 4 illustrates example components of the base station/eNB 110 and UE 120 illustrated in FIG. 1, which may be used to implement aspects of the present disclosure. One or more components of the UE 120 may be used to practice aspects of the present disclosure. For example, antennas 452, Tx/Rx 222, processors 466, 458, 464, and/or controller/processor 480 of the UE 120 may be used to perform the operations described herein and illustrated with reference to FIGS. 12-14.

FIG. 4 shows a block diagram of a design of a base station/eNodeB 110 and a UE 120, which may be one of the base stations/eNodeBs and one of the UEs in FIG. 1. For a restricted association scenario, the base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively. The base station 110 may include a PDU communicating component 1242 for communicating the PDUs to the UE 120, as described further herein. Though PDU communicating component 1242 is shown as coupled to controller/processor 440, in some examples PDU communicating component 1242 can also be coupled to other processors (e.g., transmit processor 420, receive processor 438, etc.) and/or implemented by the one or more processors 420, 438, 440 to perform actions described herein.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440. The UE 120 may include a PDU processing component 1212 for processing one or more received PDUs and/or taking actions for missing or reordered PDUs, as described further herein. Though PDU processing component 1212 is shown as coupled to controller/processor 480, in some examples PDU processing component 1212 can also be coupled to other processors (e.g., receive processor 458, transmit processor 464, etc.) and/or implemented by the one or more processors 458, 464, 480 to perform actions described herein.

The controllers/processors 440 and 480 may direct the operation at the base station 110 and the UE 120, respectively. The processor 480 and/or other processors and modules at the UE 120 may also perform or direct, e.g., the execution of the functional blocks illustrated in FIGS. 12-14, and/or other processes for the techniques described herein. The memories 442 and 482 may store data and program codes for the base station 110 and the UE 120, respectively. A scheduler 444 may schedule UEs for data transmission on the downlink and/or uplink.

In one configuration, the UE 120 includes means for receiving packet data convergence protocol (PDCP) protocol data units (PDUs) from one or more evolved Node Bs (eNBs) using a link associated with each respective eNB, means for tracking a time of receipt of the PDUs by the UE on a per PDCP PDU basis, and means for taking one or more actions to reorder the received PDCP PDUs based, at least in part, on the tracked time. In one aspect, the aforementioned means mentioned above and other means described in the disclosure may be the controller/processor 480, the memory 482, the receive processor 458, the demodulators 454, and the antennas 452. In another aspect, the aforementioned means may be a module or any apparatus configured to perform the functions recited by the aforementioned means.

Figure 5:
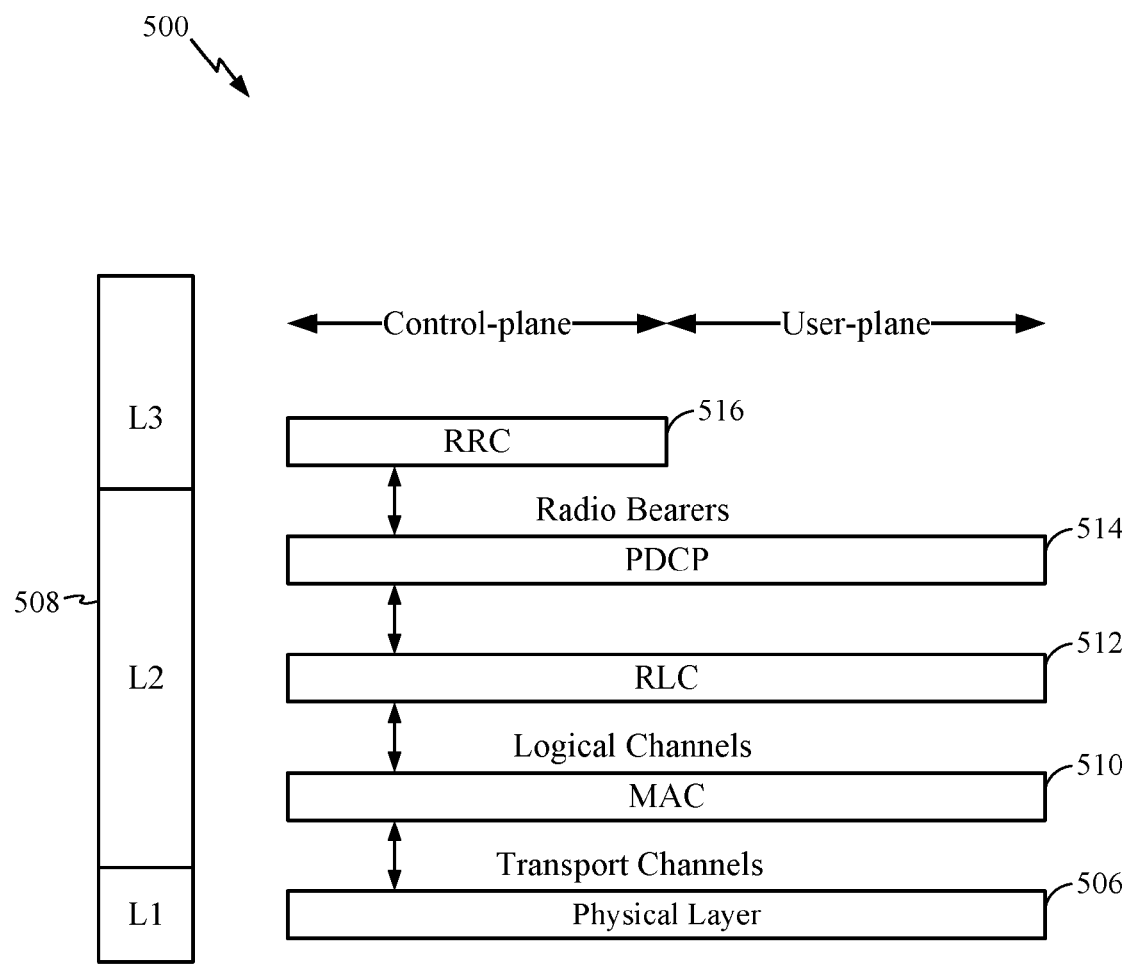
FIG. 5 is a diagram illustrating an example radio protocol architecture for the user and control planes, according to aspects of the present disclosure.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
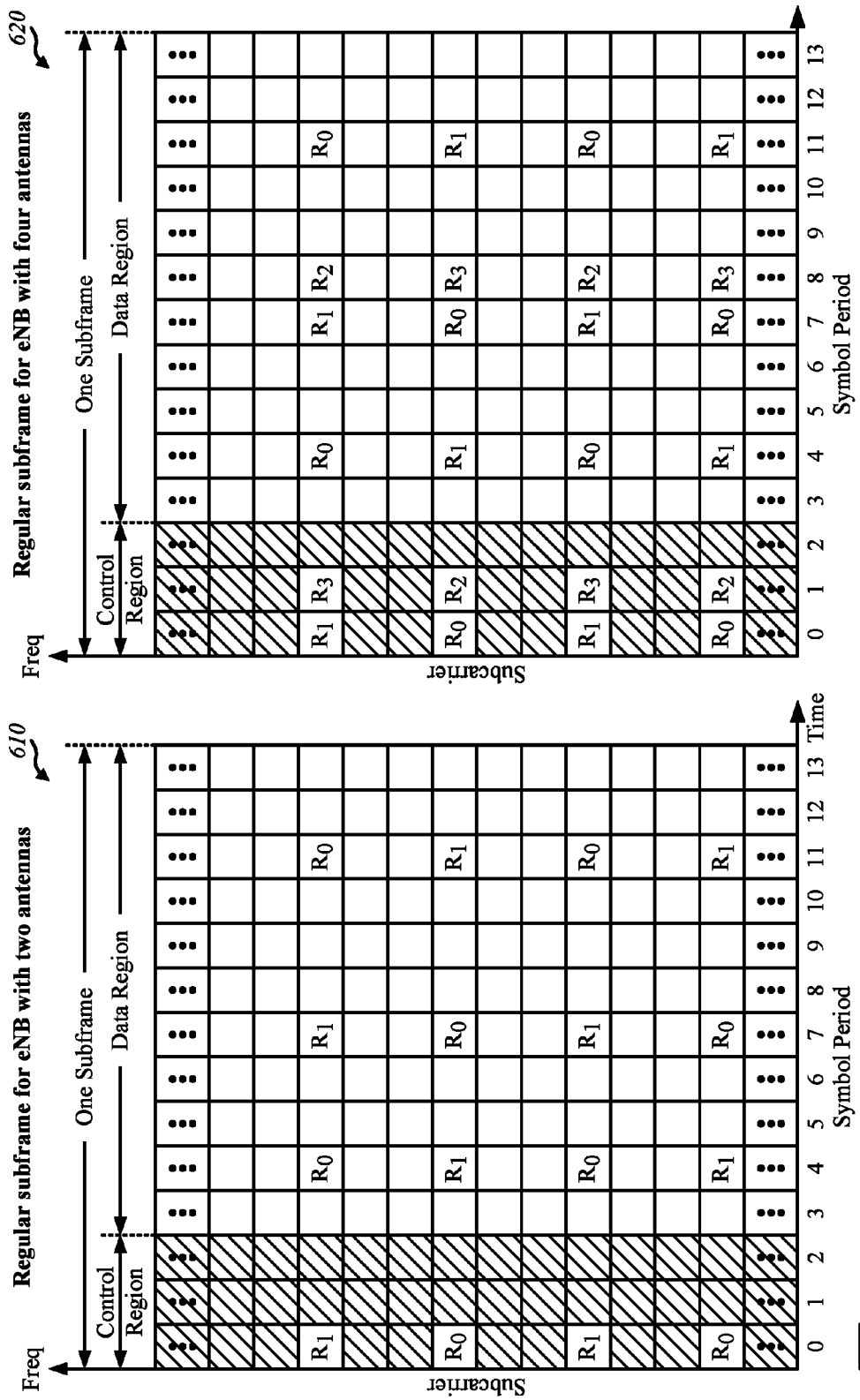
FIG. 6 illustrates an example subframe resource element mapping, according to aspects of the present disclosure.

FIG. 6 shows two exemplary subframe formats 610 and 620 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 610 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as a pilot. A CRS is a reference signal that is specific for a cell, e.g., generated based on a cell identity (ID). In FIG. 6, for a given resource element with label $R_a$, a modulation symbol may be transmitted on that resource element from antenna a, and no modulation symbols may be transmitted on that resource element from other antennas. Subframe format 620 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 610 and 620, a CRS may be transmitted on evenly spaced subcarriers, which may be determined based on cell ID. Different eNBs may transmit their CRSs on the same or different subcarriers, depending on their cell IDs. For both subframe formats 610 and 620, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available.

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage area of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering eNBs.

Figure 7:
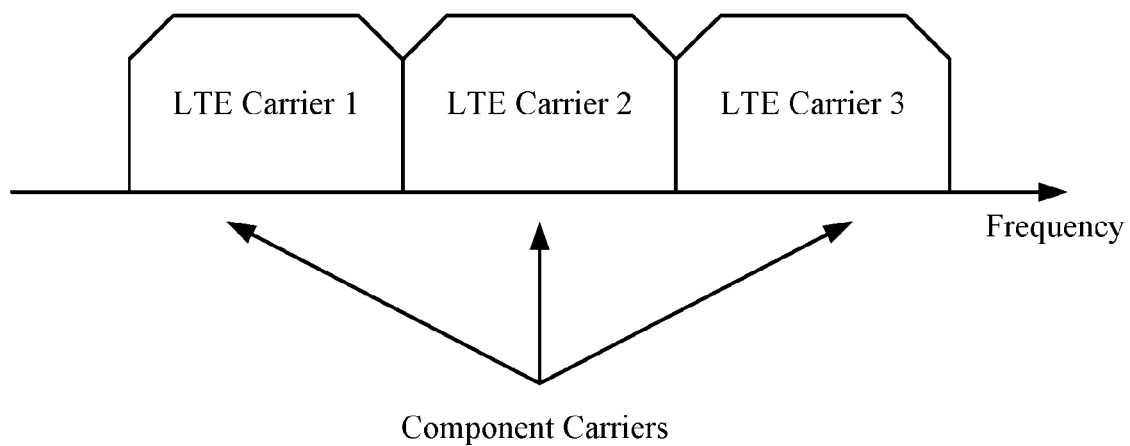
FIG. 7 illustrates an example continuous carrier aggregation type, according to aspects of the present disclosure.
Figure 8:
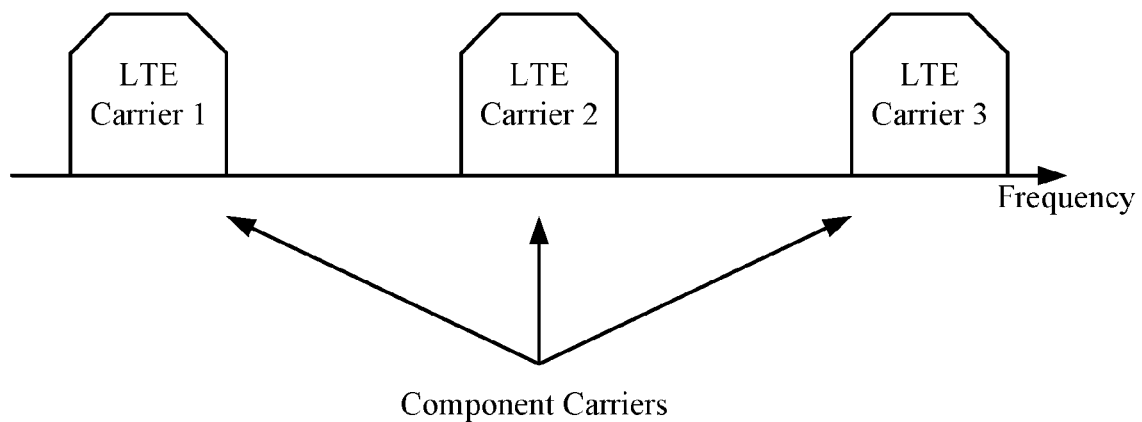
FIG. 8 illustrates an example non-continuous carrier aggregation type, according to aspects of the present disclosure.

LTE-Advanced UEs may use spectrum of up to 20 MHz bandwidths allocated in a carrier aggregation of up to a total of 100 MHz (5 component carriers) used for transmission in each direction. For the LTE-Advanced mobile systems, two types of carrier aggregation (CA) methods have been proposed, continuous CA and non-continuous CA. They are illustrated in FIGS. 7 and 8. Continuous CA occurs when multiple available component carriers are adjacent to each other (FIG. 7). On the other hand, non-continuous CA occurs when multiple available component carriers are separated along the frequency band (FIG. 8). Both non-continuous and continuous CA aggregate multiple LTE/component carriers to serve a single unit of LTE Advanced UE. According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH).

Figure 9:
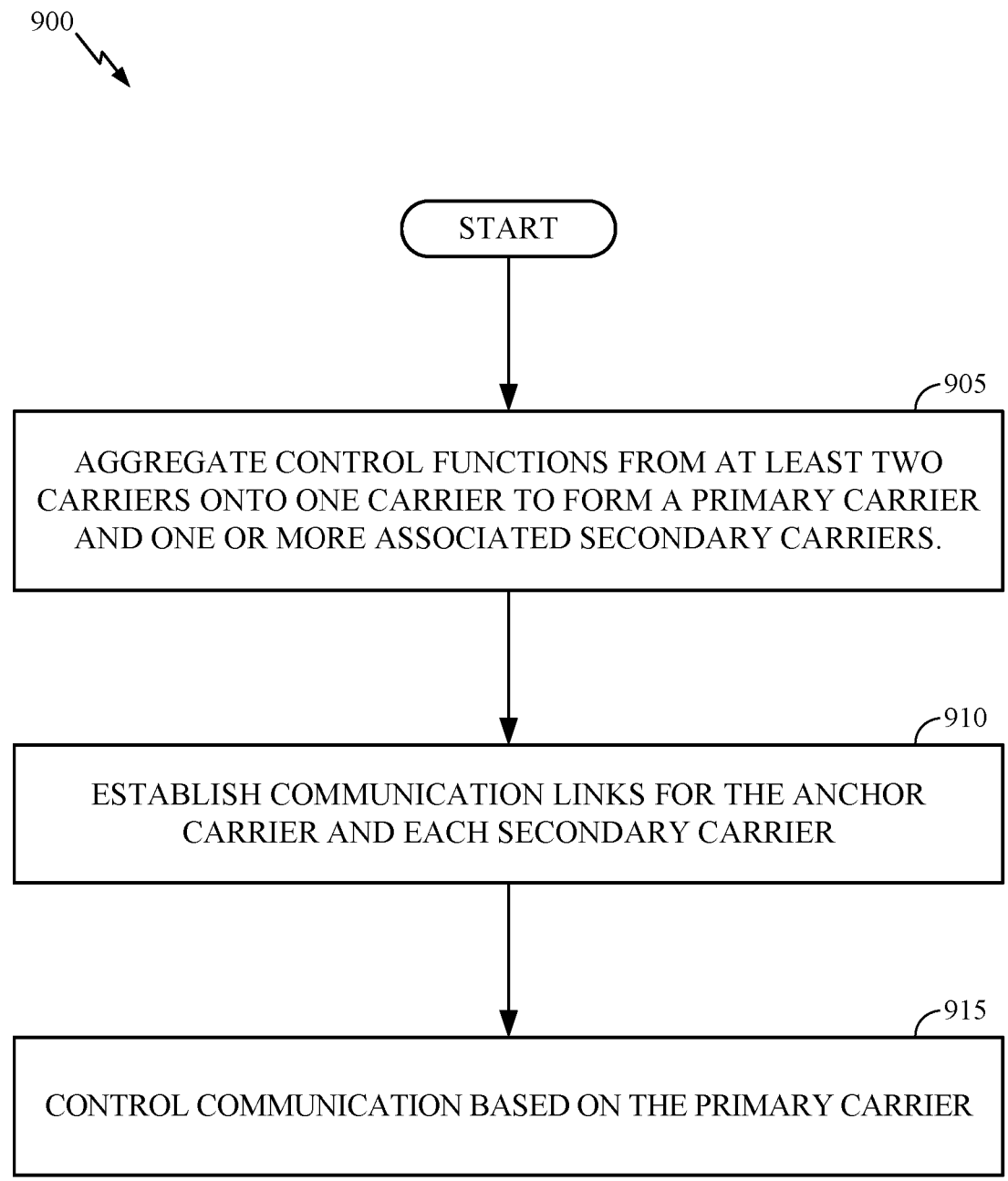
FIG. 9 is a block diagram illustrating example operations for controlling radio links in multiple carrier configurations, according to aspects of the present disclosure.

FIG. 9 illustrates a method 900 for controlling radio links in a multiple carrier wireless communication system by grouping physical channels according to one example. As shown, the method includes, at block 905, aggregating control functions from at least two carriers onto one carrier to form a primary carrier and one or more associated secondary carriers. Next at block, 910, communication links are established for the primary carrier and each secondary carrier. Then, communication is controlled based on the primary carrier in block 915.

Figure 10:
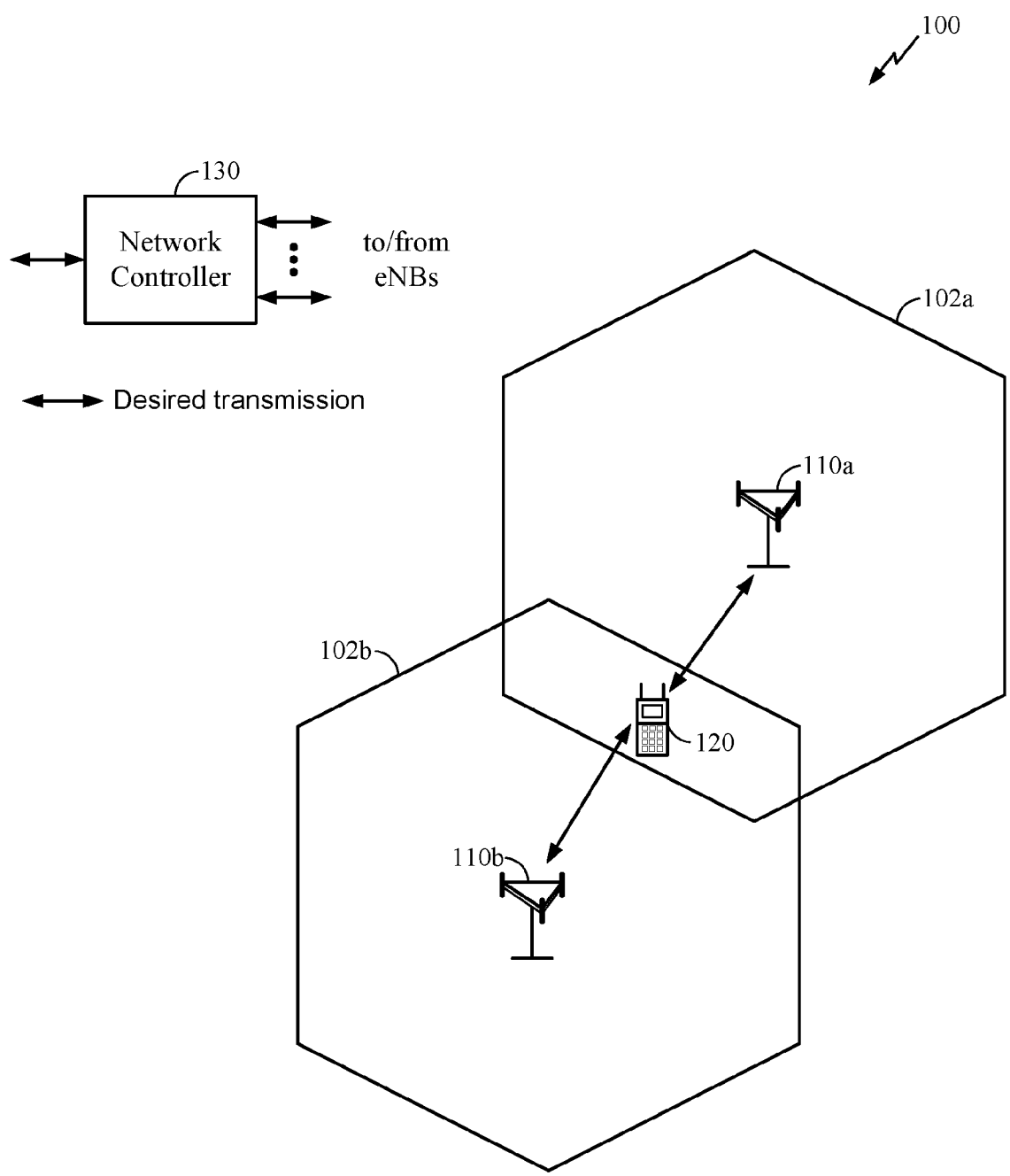
FIG. 10 illustrates an example dual connectivity scenario using multiflow to deliver simultaneous data streams, according to aspects of the present disclosure.

Presently, UEs receive data from one eNodeB. However, users on a cell edge may experience high inter-cell interference which may limit the data rates. Multiflow allows users to receive data from two eNodeBs simultaneously. It works by sending and receiving data from the two eNodeBs in two totally separate streams when a UE is in range of two cell towers in two adjacent cells at the same time. The UE talks to two towers simultaneously when the device is on the edge of either towers' reach (see FIG. 10). By scheduling two independent data streams to the mobile device from two different NodeBs at the same time, multiflow exploits uneven loading in networks. This helps improve the cell edge user experience while increasing network capacity. In one example, throughput data speeds for users at a cell edge may double. "Multiflow" is similar to dual-carrier High Speed Packet Access (HSPA), however, there are differences. For example, dual-carrier HSPA does not allow for connectivity to multiple towers to connect simultaneously to a device.

Dual connectivity (DC) (also known as multiflow or multiple connectivity) may have benefits in the cellular industry. DC, as referred to herein, can also encompass multiple connectivity (e.g., connectivity with more than two links). Users on a cell edge may experience high inter-cell interference which may limit the user's data rates. A dual connectivity/multiple connectivity solution enables a UE to simultaneously connect to two eNBs—a Master eNB (MeNB) and one or more secondary eNBs (SeNB) which are not collocated and can be connected via a non-ideal backhaul (e.g., backhaul 1120). DC works by sending and receiving data from the two eNodeBs in two separate streams when a UE is in range of two or more cell towers in two or more adjacent cells at the same time. The UE talks to the two or more towers simultaneously when the device is on the edge of either towers' reach (see FIG. 11). Thus, the different eNBs may use different schedulers, etc. In additional or alternative examples, one or more of the different eNBs may be another type of access point (e.g., a WiFi hotspot) where traffic aggregation (e.g., RAN aggregation) can be provided to aggregate data communicated over links with the access point and another access point or eNB at a RAN layer. For example, the UE 120 may include a PDU processing component 1212 for processing one or more received PDUs and/or taking actions for missing or reordered PDUs, as described further herein. Similarly, one or more evolved Node Bs (eNodeBs) 1102, 1104 or other access points (e.g., WiFi hotspots) may include a PDU communicating component 1242 for communicating the PDUs to the UE 120, as described further herein.

Figure 11:
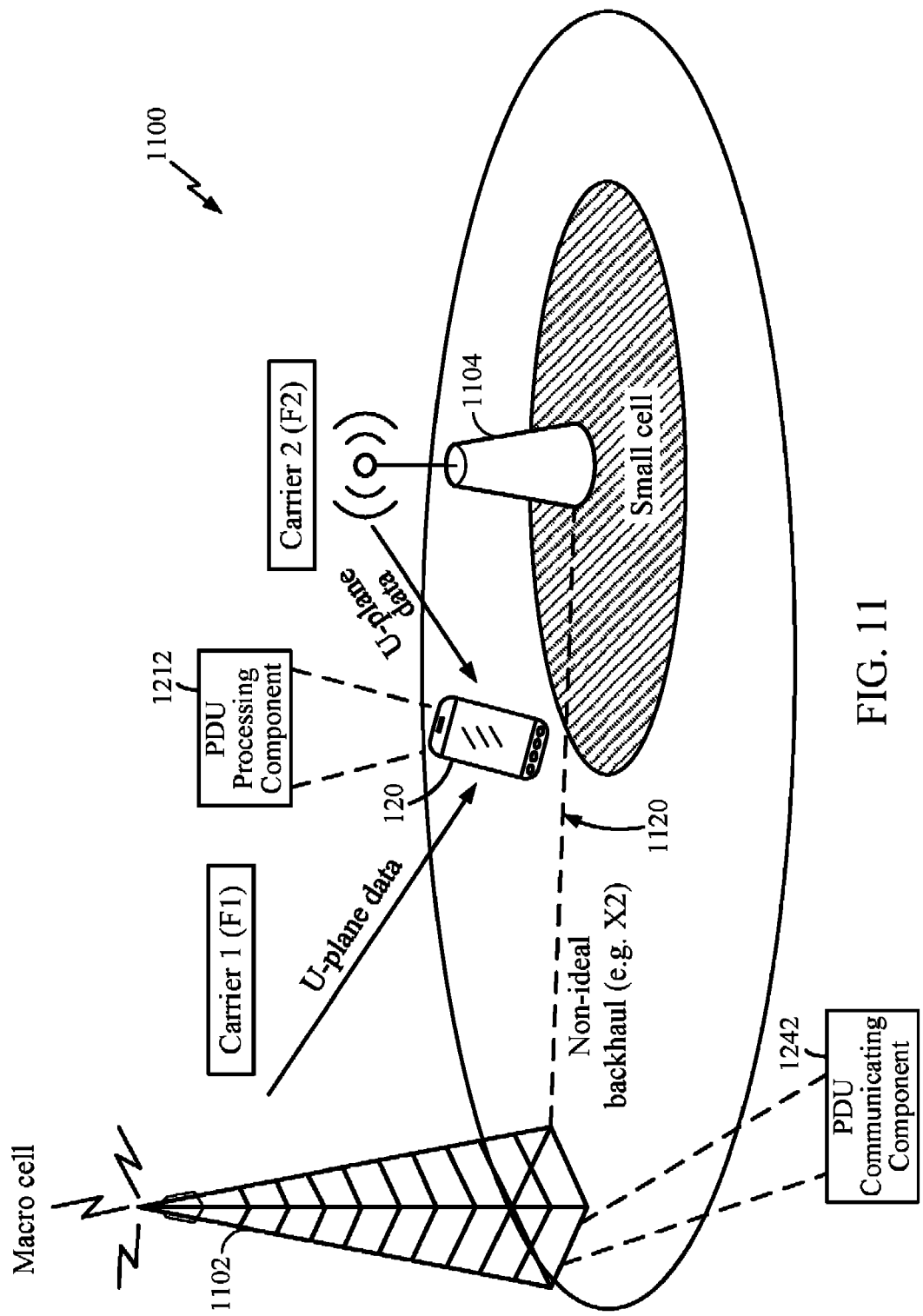
FIG. 11 is a diagram illustrating an example dual connectivity scenario, according to aspects of the present disclosure.

As shown in FIG. 11, the UE 120 may be dually connected to the macro cell 1102 and the small cell 1104 (and or multiply connected with additional cells/access points), and the eNBs may be connected via a non-ideal backhaul 1120 and operate on different carrier frequencies. With carrier aggregation multiple LTE/component carriers are aggregated to serve a single unit of LTE Advanced UE. By scheduling two or more independent data streams to the mobile device from two or more different NodeBs (or other types of access points) at the same time, dual connectivity/ multiple connectivity exploits uneven loading. This helps improve the cell edge user experience while increasing network capacity. In one example, throughput data speeds for users at a cell edge may double or more.

In certain aspects, due to the distributed nature of this deployment scenario (separate eNBs connected via a non-ideal backhaul) separate uplink control channels for the eNBs (MeNB and SeNB) are used to support distributed scheduling and independent MAC (Medium Access Control) operation across eNBs. This is unlike CA (Carrier Aggregation) deployment, in which a single MAC/scheduling entity operates across all the carriers and a single uplink control channel is used.

In the current LTE specification, the Primary Cell (PCell of MeNB) is the cell which carries the uplink control channels, e.g., the PUCCH. For dual connectivity, a special cell on the SeNB may be introduced in order to support the uplink control channels for the SeNB. Also, with dual connectivity/multiple connectivity, uplink control channels for the MeNB and the SeNB can be used, one for each eNB. The presence of an uplink control channel for the SeNB motivates the use for a SeNB Radio Link Monitoring (S-RLM) procedure. This procedure may be used by the UE to trigger SeNB Radio Link Failure (S-RLF). The S-RLF is useful, among other things, to trigger procedures that prevent a UE from jamming the uplink control channels when it loses downlink connection to a SeNB. Another reason a special RLF procedure may be used for the SeNB is that the MeNB may experience different channel conditions than the SeNB.

In certain aspects, unlike the legacy RLF procedure, the S-RLF does not involve loss of RRC connection since the connection to the MeNB remains. Hence, certain C-Plane procedures (such as RRC Connection Reestablishment) may not be applicable under S-RLF.

As described with reference to FIG. 11, a UE using DC, multiple connectivity, or other types of traffic/RAN aggregation may consume radio resources provided by at least two different network points (e.g., two eNBs, such as a Master (MeNB) and Secondary (SeNB)), which may not be synchronized or otherwise have tight timing and/or scheduling coordination. In LTE, a reorder timer can be provided per radio bearer dedicated to PDU reordering functionality (e.g., at the PDCP layer), where based on expiration of the reorder timer, service data units (SDU) related to PDUs for which the reorder timer is started can be flushed to the PDCP layer. Having a single reorder timer for a specific radio bearer may advantageously enable a straightforward implementation for PDCP reordering.

PDCP reordering, in which PDUs may be received out of order and later reordered based on sequence numbers, may allow a UE to communicate with two or more different eNBs without tight timing or scheduling coordination. PDCP reordering may be part of further aggregation between LTE and Wi-Fi/5G wireless technology systems. The PDCP layer performs a number of functions such as i) header compression of IP packets along with their corresponding decompression, ii) integrity verification and protection which helps ensure the correct source sends the control information, and iii) ciphering and deciphering both user and control plane data, Also, the PDCP layer can be used for sending RRC messages. In the UL direction, PDCP SDUs can be received from the RRC and non-access stratum (NAS), ciphered, and sent to the RLC layer. In the downlink direction, the PDCP layer can also handle in-order delivery and detects duplicate packets. Additionally, to ensure no data is lost in connection with a handover, non-delivered packets are forwarded to a new eNB by the PDCP layer. In the uplink direction, all packets not having been indicated by lower layers as having been completed can be retransmitted by the PDCP layer because HARQ buffers can be flushed by lower layers when a handover occurs.

The PDCP layer of a UE may reorder PDCP PDUs received on two or more different links associated with two or more different eNBs (or other access points) which are dually-connected or multiply-connected with the UE. The reordering may be based, for example, on sequence numbers (SNs) associated with the received PDCP PDUs. Additionally, in each link there can be a reordering performed by the RLC layer or other layers below the PDCP layer (see e.g., 512 and 514 of FIG. 5).

In some cases, however, the two eNBs/access points may not always be synchronized in time and/or the links associated with each of the eNBs/access points may experience different delays. In an example where the links of two eNBs/access points experience different delays, PDUs from one eNB/access point may arrive out of order at the PDCP layer.

For example, with reference to FIG. 11, a UE 120 may include a PDU processing component 1212 for processing one or more received PDUs and/or taking actions for missing or reordered PDUs, as described further herein. Similarly, one or more evolved Node Bs (eNodeBs) or other access points (e.g., Wi-Fi hotspots), such as Macro cell 1102, Small cell 1104, etc., may include a PDU communicating component 1242 for communicating the PDUs to the UE 120, as described further herein. In an example, the UE 120 may receive PDUs with SNs 1-5 from Macro cell 1102 at time T1. At time T2, the UE 120 may then receive PDUs with SNs 10-15 from Macro cell 1102 without first receiving PDUs with SNs 6-9 from Small cell 1104 (or another cell). The PDUs with SNs 10-15 received at time T2 may thus be considered out of order, with PDUs with SNs 6-9 missing.

When a PDU is received out of order, the UE may start a reorder timer to wait for PDUs missing from the order (e.g., in the above example, PDUs with SNs 6-9 to be received from Small cell 1104 or another cell). If the missing PDUs are received before expiration of the reorder timer, the UE's PDCP layer may flush the received SDUs/PDUs up to a higher layer in ascending order. In an example, similar reorder timer, SDU/PDU flushing, etc. concepts can be applied where PDUs are received from multiple eNBs/access points at other layers (e.g., PDUs received at a transmission control protocol (TCP) layer, which are comprised of PDCP SDUs).

If, however, due to poor link quality or overloading at the eNB, the missing PDUs are not received before expiration of the reorder timer, the PDCP layer can flush all PDCP SDUs (e.g., RLC PDUs) to an upper layer in ascending order up to the PDU associated with a Reordering_PDCP_RX_COUNT and any subsequent consecutively received SDUs relating to the PDU. Once the reorder timer expires, the PDCP layer can "give up" on the missing PDUs and deliver what it has received so far to the upper layer, letting the upper layer handle the missing packets. In some cases, the reorder timer may expire because packets coming over the link from the other eNB may be delayed due to, for example, overloading or other undesirable link conditions. In another scenario, if the link is bad between the eNB and the UE, various retransmissions may be used in an attempt to fully deliver the packets, thus causing delay. In the case of TCP, the receiver may generate a duplicate ACK. Additionally, SDUs can be transmitted by an eNB in ascending order. For example, if UE receives PDCP PDU of sequence number N, then the UE may not receive PDCP PDUs of sequence number <N if not received before the PDCP PDU of sequence number N.

In Acknowledgement Mode (AM), which can be used in dual-connectivity (or multiple connectivity), missing PDUs that the UEs PDCP layer may have given up on can still be transmitted (e.g., retransmitted) by the eNB, only to be discarded by the UE once later received. The eNB may continue sending the missing PDUs until the eNB receives an ACK (from one of the UEs) for the missing PDUs. Additionally, with AM, an ACK can be sent based on receiving a packet and a NAK can be sent based on detecting that a packet is not received.

In an example with reference to FIG. 11, assuming a 100 ms PDCP reorder timer, at time T, a UE 120 may receive PDUs with SNs=0, 1, 2, 3, 4, 5 in order on Carrier 1 from Macro cell 1102. The UE's PDCP layer may subsequently deliver corresponding SDUs to an upper layer (e.g., a TCP/IP layer, user datagram protocol (UDP) layer, etc.).

At time T+1 ms, the UE 120 may receive PDUs with SNs=10, 11, 12, 13, 14, 15 on Carrier 1 from Macro cell 1102. However, the UE 120, by this time, may not have received PDUs with SNs=6, 7, 8, 9. For example, the UE 120 may not have received these PDUs from Small cell 1104 (or other eNB/access point in DC or traffic/RAN aggregation) on Carrier 2. For example, this may be due to due to a link quality issue, an overloading delay, or other condition at the Small cell 1104 or related to Carrier 2. As such, the UE 120 may subsequently start a reorder timer (e.g., set at 100 ms) and may set a Reordering_PDCP_RX_COUNT to 16 (i.e., the last received PDCP PDU SN+1).

At time T+101 ms, PDU SNs=6, 7, 8, 9 may still have not been received from Small cell 1104 on Carrier 2, and, as a result, the reorder timer started at T+1 ms expires. Subsequently, the PDCP layer can deliver the PDCP SDUs corresponding to SNs=10, 11, 12, 13, 14, 15 to the upper later. When the PDUs with SNs=6, 7, 8, 9 are later received on Carrier 2 from Small cell 1104, the PDCP layer may discard them as they are outside of the receive window (i.e., after expiration of the reorder timer).

Thus, in an example, the transmission of PDUs with SNs=6, 7, 8, 9 may not be needed and thus may be wasted on Carrier 2 by Small cell 1104 since the PDUs arrived after the reorder timer expired. This may be even more pronounced, in an example, for the following reasons. First, Carrier 2 may have an undesirable geometry (e.g., bad link quality) for the UE, which may result in consuming more eNB resources to carry the payload (e.g., the eNB may retransmit the payload many times, only to be discarded by the UE 120) and potentially causing a radio link failure (RLF). Second, Small cell 1104 may be overloaded and transmitting unneeded payload (e.g., payload that is just going to be discarded by the UE) potentially impacting the user experience of other UEs.

Accordingly, aspects of the present disclosure provide techniques for avoiding unnecessary PDU transmissions (e.g., at the PDCP layer or other layers), for example, when a reorder timer expires. That is, aspects of the present disclosure provide techniques for avoiding transmission of PDUs that may eventually be discarded by the UE, for example, because they arrive after the reorder timer expires.

Referring to FIGS. 12-16, aspects are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described below in FIGS. 13-16 are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions, such as a processor and software, a processor and code, a processor and memory, etc.

Figure 12:
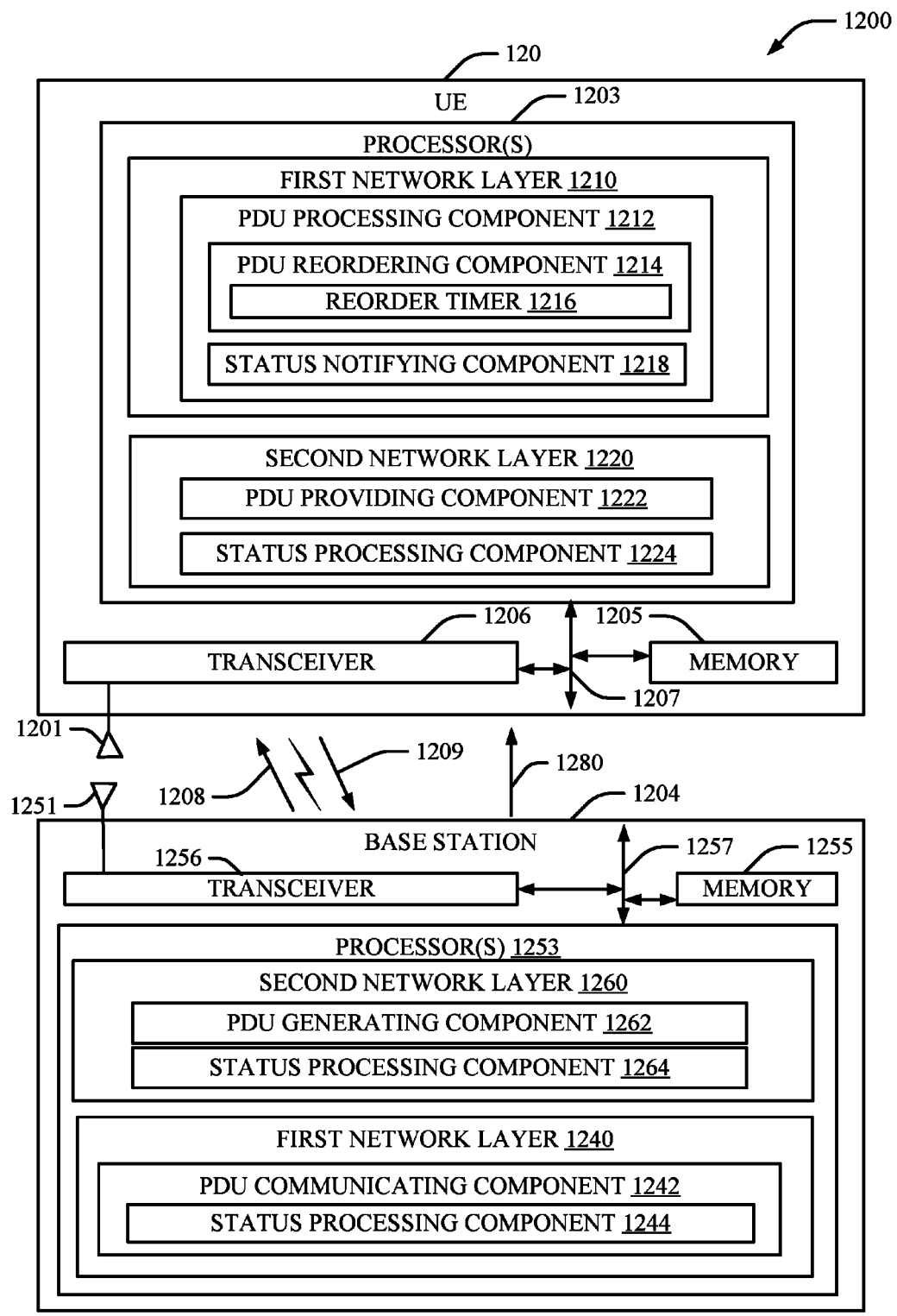
FIG. 12 illustrates an example system including a UE and a base station, according to aspects of the present disclosure.

FIG. 12 illustrates an example system 1200 for communicating PDUs in wireless communications. System 1200 includes a UE 120 that communicates with a base station 1204 (which may include a eNodeB 110, Macro cell 1102, Small cell 1104, or substantially any access point) at multiple network layers, which may include receiving PDUs at one network layer that may be SDUs for forming PDUs at a lower network layer, etc. In an example, base station 1204 and UE 120 may have established one or more downlink channels over which to communicate downlink signals 408, which can be transmitted by base station 1204 (e.g., via transceiver 1256) and received by UE 120 (e.g., via transceiver 1206) for communicating control and/or data messages (e.g., in signaling) from the base station 1204 to the UE 120 over configured communication resources. Moreover, for example, base station 1204 and UE 120 may have established one or more uplink channels over which to communicate via uplink signals 1208, which can be transmitted by UE 120 (e.g., via transceiver 1206) and received by base station 1204 (e.g., via transceiver 1256) for communicating control and/or data messages (e.g., in signaling) from the UE 120 to the base station 1204 over configured communication resources. In an example, PDU communicating component 1242 can transmit one or more PDUs 1280 at a first network layer 1240 (e.g., where the one or more PDUs 1280 can be transmitted in one or more PDUs of a second network layer 1260) to UE 120, as described, which can be received by first network layer 1210 (e.g., via a lower second network layer 1220 as one or more PDUs thereof).

In an aspect, UE 120 may include one or more processors 1203 and/or a memory 1205 that may be communicatively coupled, e.g., via one or more buses 1207, and may operate in conjunction with or otherwise implement a PDU processing component 1212 for processing one or more PDUs received from a base station 1204 (or other transmitting device) via one or more network layers. For example, the various operations related to PDU processing component 1212 as described herein may be implemented or otherwise executed by one or more processors 1203 and, in an aspect, can be executed by a single processor, while in other aspects, different ones of the operations may be executed by a combination of two or more different processors. For example, in an aspect, the one or more processors 1203 may include any one or any combination of a modem processor, or a baseband processor, or a digital signal processor, or an application specific integrated circuit (ASIC), or a transmit processor, receive processor, or a transceiver processor associated with transceiver 1206. Further, for example, the memory 1205 may be a non-transitory computer-readable medium that includes, but is not limited to, random access memory (RAM), read only memory (ROM), programmable ROM (PROM), erasable PROM (EPROM), electrically erasable PROM (EEPROM), a magnetic storage device (e.g., hard disk, floppy disk, magnetic strip), an optical disk (e.g., compact disk (CD), digital versatile disk (DVD)), a smart card, a flash memory device (e.g., card, stick, key drive), a register, a removable disk, and any other suitable medium for storing software and/or computer-readable code or instructions that may be accessed and read by a computer or one or more processors 1203. Moreover, memory 1205 or computer-readable storage medium may be resident in the one or more processors 1203, external to the one or more processors 1203, distributed across multiple entities including the one or more processors 1203, etc.

In particular, the one or more processors 1203 and/or memory 1205 may execute actions or operations defined by PDU processing component 1212 or its subcomponents. For instance, the one or more processors 1203 and/or memory 1205 may execute actions or operations defined by a PDU reordering component 1214 for reordering PDUs received out of order from one or more base stations or other access points, such as base station 1204. In an aspect, for example, PDU reordering component 1214 may include hardware (e.g., one or more processor modules of the one or more processors 1203) and/or computer-readable code or instructions stored in memory 1205 and executable by at least one of the one or more processors 1203 to perform the specially configured PDU reordering operations described herein. Furthermore, for example, PDU reordering component 1214 may include a reorder timer 1216 for determining when to flush PDUs that are received out of order without subsequently receiving other PDUs in the sequence. For instance, the one or more processors 1203 and/or memory 1205 may execute actions or operations defined by a status notifying component 1218 for notifying another network layer and/or one or more base stations/access points that one or more PDUs are or are not received. In an aspect, for example, status notifying component 1218 may include hardware (e.g., one or more processor modules of the one or more processors 1203) and/or computer-readable code or instructions stored in memory 1205 and executable by at least one of the one or more processors 1203 to perform the specially configured status notifying operations described herein.

In an example, the one or more processors 1203 and/or memory 1205 may execute the actions or operations of PDU processing component 1212 at a first network layer 1210, and may also execute actions or operations at a second network layer 1220. For example, the first network layer 1210 and the second network layer 1220 may each be one or more network layers described in FIG. 5 (e.g., a PDCP layer 514, RLC layer 512), and/or other layers, such as a TCP layer, IP layer, TCP/IP layer, UDP layer, etc. In a specific example, the first network layer 1210 can be a PDCP layer and the second network layer 1220 can be a RLC layer such that the second network layer 1220 can send RLC SDUs that include one or more PDCP PDUs to the first network layer 1210, and the first network layer 1210 can form PDCP SDUs (e.g. for providing to other network layers, such as a TCP/IP layer, etc.). In another specific example, the first network layer 1210 can be a TCP/IP layer and the second network layer 1220 can be a PDCP layer such that the second network layer 1220 can send PDCP SDUs that include one or more TCP/IP PDUs to the first network layer 1210, and the first network layer 1210 can form TCP/IP SDUs (e.g. for providing to other network layers, such an application layer).

In another aspect, the one or more processors 1203 and/or memory 1205 may optionally execute actions or operations defined by a PDU providing component 1222 for providing one or more SDUs including higher network layer PDUs to the higher network layer (e.g., first network layer 1210). In an aspect, for example, PDU providing component 1222 may include hardware (e.g., one or more processor modules of the one or more processors 1203) and/or computer-readable code or instructions stored in memory 1205 and executable by at least one of the one or more processors 1203 to perform the specially configured SDU/PDU providing operations described herein. In an aspect, the one or more processors 1203 and/or memory 1205 may optionally execute actions or operations defined by a status processing component 1224 for receiving and/or processing a status of another network layer with respect to receiving one or more PDUs or portions thereof from second network layer 1220. In an aspect, for example, status processing component 1224 may include hardware (e.g., one or more processor modules of the one or more processors 1203) and/or computer-readable code or instructions stored in memory 1205 and executable by at least one of the one or more processors 1203 to perform the specially configured status processing operations described herein.

Similarly, in an aspect, base station 1204 may include one or more processors 1253 and/or a memory 1255 that may be communicatively coupled, e.g., via one or more buses 1257, and may operate in conjunction with or otherwise implement a PDU communicating component 1242 for communicating (e.g., transmitting, retransmitting, etc.) one or more PDUs to one or more UEs (e.g., UE 120 via one or more network layers, as described). For example, the various functions related to PDU communicating component 1242 may be implemented or otherwise executed by one or more processors 1253 and, in an aspect, can be executed by a single processor, while in other aspects, different ones of the functions may be executed by a combination of two or more different processors, as described above. It is to be appreciated, in one example, that the one or more processors 1253 and/or memory 1255 may be configured as described in examples above with respect to the one or more processors 1203 and/or memory 1205 of UE 120.

In an example, the one or more processors 1253 and/or memory 1255 may execute actions or operations defined by PDU communicating component 1242 or its subcomponents. For instance, the one or more processors 1253 and/or memory 1255 may execute actions or operations defined by a status processing component 1244 for processing a status from the one or more UEs related to receiving one or more PDUs from the base station 1204. In an aspect, for example, status processing component 1244 may include hardware (e.g., one or more processor modules of the one or more processors 1253) and/or computer-readable code or instructions stored in memory 1255 and executable by at least one of the one or more processors 1253 to perform the specially configured status processing operations described herein.

In an example, the one or more processors 1253 and/or memory 1255 may execute the actions or operations of PDU communicating component 1242 at a first network layer 1240, and may also execute actions or operations at a second network layer 1260. For example, the first network layer 1240 and the second network layer 1260 may each be one or more network layers described in FIG. 5 (e.g., a RLC layer 512, PDCP layer 514), and/or other layers, such as a TCP layer, IP layer, TCP/IP layer, UDP layer, etc. In a specific example, the first network layer 1240 can be a PDCP layer and the second network layer 1260 can be a RLC layer such that the first network layer 1240 can provide PDCP PDUs to the second network layer 1260, which can form RLC PDUs for sending to UE 120. In another specific example, the first network layer 1240 can be a TCP/IP layer and the second network layer 1260 can be a PDCP layer such that the first network layer 1240 can provide TCP/IP PDUs to the second network layer 1260, which can form PDCP PDUs for sending to UE 120 (e.g., as one or more corresponding RLC PDUs, etc.).

In another aspect, the one or more processors 1253 and/or memory 1255 may optionally execute actions or operations defined by a PDU generating component 1262 for generating or otherwise receiving one or more PDUs from another network layer (e.g., first network layer 1240) for transmitting (e.g., via transceiver 1256). In an aspect, for example, PDU generating component 1262 may include hardware (e.g., one or more processor modules of the one or more processors 1253) and/or computer-readable code or instructions stored in memory 1255 and executable by at least one of the one or more processors 1253 to perform the specially configured PDU generating operations described herein. In an aspect, the one or more processors 1253 and/or memory 1255 may optionally execute actions or operations defined by a status processing component 1264 for receiving and/or processing a status of another network layer with respect to receiving one or more PDUs or portions thereof from second network layer 1260. In an aspect, for example, status processing component 1264 may include hardware (e.g., one or more processor modules of the one or more processors 1253) and/or computer-readable code or instructions stored in memory 1255 and executable by at least one of the one or more processors 1253 to perform the specially configured status processing operations described herein.

In an example, transceivers 1206, 1256 may be configured to transmit and receive one or more wireless signals through one or more antennas, such as antennas 1201, 1251, respectively, an RF front end or related components (e.g., one or more power amplifiers, one or more low noise amplifiers, one or more filters, one or more digital-to-analog converters or analog-to-digital converters, etc.), one or more transmitters, and one or more receivers. In an aspect, transceivers 1206, 1256 may be tuned to operate at specified frequencies such that UE 120 and/or base station 1204 can communicate at a certain frequency. In an aspect, the one or more processors 1203 may configure transceiver 1206 and/or one or more processors 1253 may configure transceiver 1256 to operate at a specified frequency and power level based on a configuration, a communication protocol, etc. to communicate uplink signals and/or downlink signals over related uplink or downlink communication channels over the one or more CCs.

In an aspect, transceivers 1206, 1256 can operate in multiple bands (e.g., using a multiband-multimode modem, not shown) to process digital data sent and received using transceivers 1206, 1256. In an aspect, transceivers 1206, 1256 can be multiband and be configured to support multiple frequency bands for a specific communications protocol. In an aspect, transceivers 1206, 1256 can be configured to support multiple operating networks and communications protocols. Thus, for example, transceivers 1206, 1256 may enable transmission and/or reception of signals based on a specified modem configuration.

Figure 13:
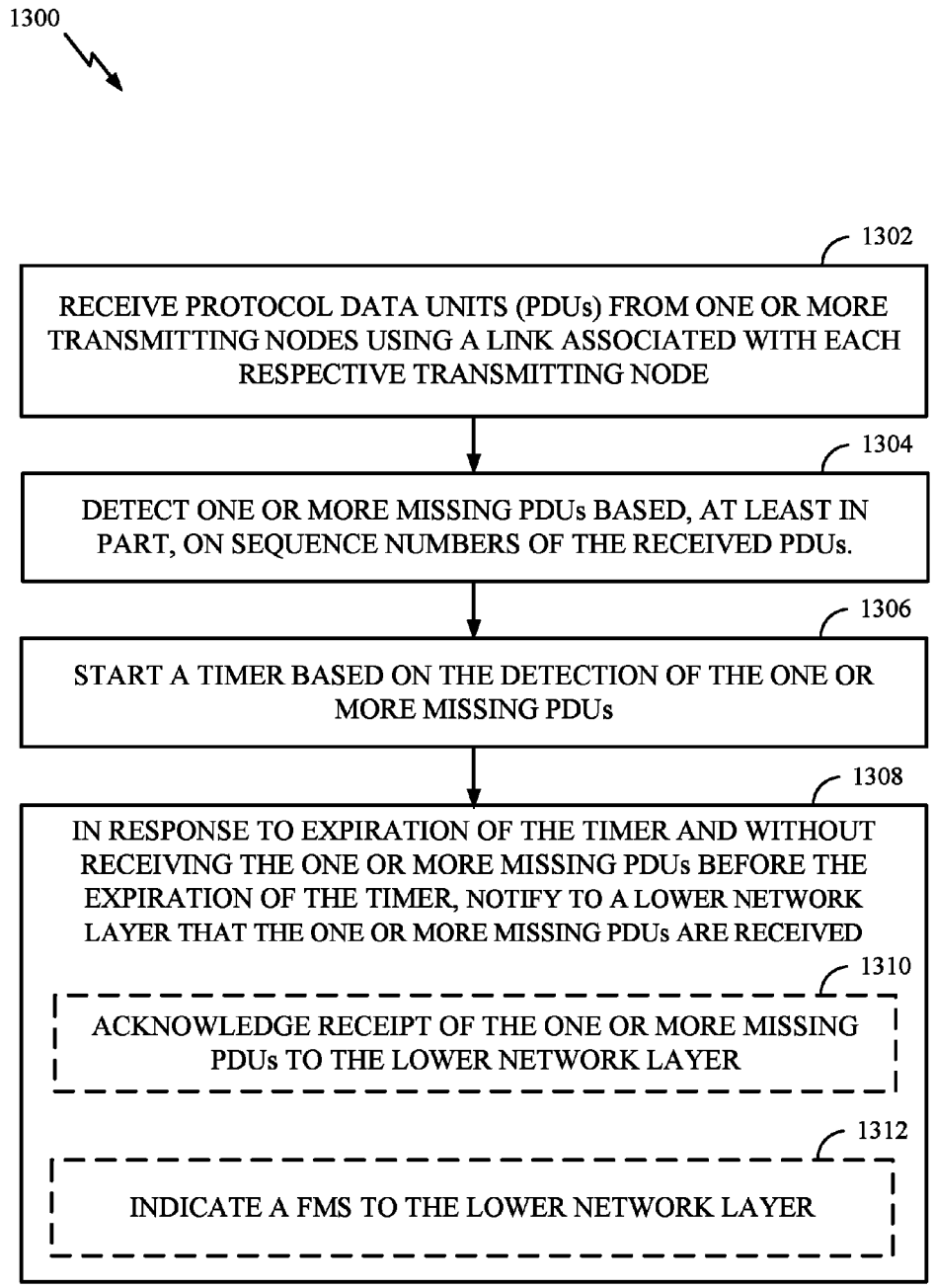
FIG. 13 illustrates example operations performed by a UE, according to aspects of the present disclosure.

FIG. 13 illustrates example operations 1300 for avoiding unnecessary PDU transmissions, for example, when a PDCP reorder timer expires. Operations 1300 may be performed, for example, by a user equipment (e.g., UE 120) or substantially any device receiving PDUs in network communications.

Operation 1300 begins at 1302 by receiving PDUs from one or more transmitting nodes using a link associated with each respective transmitting node. In an aspect, PDU processing component 1212, e.g., in conjunction with the one or more processors 1203, memory 1205 and/or transceiver 1206, can receive the PDUs 1280 from the one or more transmitting nodes (e.g., base station 1204, substantially any access point, etc.) using the link associated with each respective transmitting node. For example, PDU processing component 1212 can receive the PDUs based on SDUs received at another network layer, such as second network layer 1220. In an example, second network layer 1220 may receive PDUs for the second network layer from base station 1204 (e.g., from a lower network layer), obtain SDUs from the PDUs, and can provide the PDUs (e.g., via PDU providing component 1222) as second network layer 1220 SDUs to the first network layer 1210. PDU processing component 1212, in this example, can form PDUs of the first network layer 1210 based on the received SDUs of the second network layer 1220.

Operation 1300 includes, at 1304, detecting one or more missing PDUs based, at least in part, on sequence numbers of the received PDUs. In an aspect, PDU reordering component 1214, e.g., in conjunction with the one or more processors 1203, memory 1205 and/or transceiver 1206, can detect the one or more missing PDUs based, at least in part, on sequence numbers of the received PDUs. For example, PDU reordering component 1214 may receive one or more PDUs from a second transmitting node or otherwise over a second link (not shown, e.g., via second network layer 1220), and then may receive one or more additional out of order PDUs from the second transmitting node (e.g., via second network layer 1220) before receiving one or more in order (or sequentially next) PDUs from the first transmitting node (e.g., base station 1204). In an example, PDU reordering component 1214 may detect this based on evaluating a sequence number of the PDUs received (e.g., from the second network layer 1220), and detecting that a next expected PDU sequence number is not received before PDUs with subsequent sequence numbers, as described in various examples herein. In one example, PDU reordering component 1214 can perform payload inspection of the lower network layer (e.g., the second network layer 1220) payloads to determine sequence numbers of the received PDUs.

Operation 1300 includes, at 1306, starting a timer based on the detection of the one or more missing PDUs. In an aspect, PDU reordering component 1214, e.g., in conjunction with the one or more processors 1203, memory 1205 and/or transceiver 1206, can start the timer, such as a reorder timer 1216, based on PDU reordering component 1214 detecting the one or more missing PDUs. For example, PDU reordering component 1214 can set the reorder timer 1216 to a value configured for the UE 120 (e.g., by a configuration received from the base station 1204 or other network component, a configuration stored in the UE 120, etc.). For example, the PDU reordering component 1214 can set the reorder timer 1216 to 100 ms upon determining that an out of order PDU is received, and the reorder timer 1216 may count down from 100 ms (or up to 100 ms). As described, however, if PDU reordering component 1214 detects receipt of a missing PDU corresponding to the reorder timer 1216, PDU reordering component 1214 may stop the reorder timer 1216 (e.g., until a next out of order packet is detected, at which point the reorder timer 1216 may be initialized to a configured value, such as 100 ms in one specific example).

Operation 1300 includes, at 1308, in response to expiration of the timer and without receiving the one or more missing PDUs before the expiration of the timer, notifying to a lower network layer that the one or more missing PDUs are received. In an aspect, status notifying component 1218, e.g., in conjunction with the one or more processors 1203, memory 1205 and/or transceiver 1206, can, in response to expiration of the timer (e.g., reorder timer 1216) and without receiving the one or more missing PDUs before expiration of the timer, notify to a lower network layer (e.g., second network layer 1220 and/or a lower network layer at base station 1204 via second network layer 1220) that the one or more missing PDUs are received. This can prevent the second network layer 1220 from attempting to receive or otherwise forwarding the missing PDUs to the first network layer 1210. In another example, this can prevent the transmitting node from attempting to transmit one or more PDUs from the lower network layer (e.g., second network layer 1260) that correspond to the one or more missing PDUs of the higher network layer (e.g., first network layer 1240).

In an example, notifying that the one or more missing PDUs are received at 1308 may optionally include, at 1310, acknowledging receipt of the one or more missing PDUs to the lower network layer. In an aspect, status notifying component 1218, e.g., in conjunction with the one or more processors 1203, memory 1205 and/or transceiver 1206, can acknowledge receipt of the one or more missing PDUs to the lower network layer. In one example, status notifying component 1218 may acknowledge receipt of the one or more missing PDUs, though the PDUs were not received. In this example, the second network layer 1220 may refrain from attempting to receive and forward the one or more missing PDUs, as the second network layer 1220 moves on from the one or more missing PDUs to attempt receiving one or more subsequent PDUs based on the acknowledgement.

In another example, notifying that the one or more missing PDUs are received at 1308 may optionally include, at 1312, indicating a first missing sequence (FMS) to the lower network layer. In an aspect, status notifying component 1218, e.g., in conjunction with the one or more processors 1203, memory 1205 and/or transceiver 1206, can indicate the FMS to the lower network layer (e.g., the second network layer 1220), where the FMS can indicate a sequence number of a PDU in the received PDUs having the highest sequence number incremented by 1 (e.g., Last_Submitted_PDCP_RX_SN+1). In this example, the second network layer 1220 may refrain from attempting to receive and forward the one or more missing PDUs, as the second network layer 1220 attempts to receive and provide the first network layer 1210 with the PDU having the sequence number+1 (e.g., Last_Submitted_PDCP_RX_SN+1).

Referring back to 1310, in an example, acknowledging receipt of the one or more missing PDUs may include the lower network layer (e.g., second network layer 1220) transmitting a lower network layer status message to the base station 1204 to acknowledge receipt of the one or more missing PDUs (e.g., up to the FMS), though the one or more missing PDUs have not been received by the UE 120. For example, transmitting this acknowledgement may include transmitting a RLC status PDU where the second network layer 1260 is an RLC layer, a PDCP status PDU where the second network layer 1260 is a PDCP layer, etc. The status message, transmitted in this regard, may prevent further transmission/retransmission attempts, by the base station 1204, of any missing lower network layer PDUs associated with missing higher network layer (e.g., first network layer) sequence numbers smaller than a first mission sequence (FMS) by the base station 1204. For example, status processing component 1264 may receive the status message acknowledging receipt of the lower network layer (e.g., second network layer 1260) PDUs corresponding to the one or more missing PDUs of the higher network layer, and second network layer 1260 can refrain from transmitting the lower network layer PDUs, can remove the lower network layer PDUs from a queue for transmitting by transceiver 1256, etc.

In yet another example, as described further herein, indicating the FMS at 1312 may include transmitting a higher network layer (e.g., first network layer 1210) status PDU to the transmitting node (e.g., base station 1204) indicating receipt of the PDUs having sequence numbers less than the FMS. For example, status notifying component 1218 may transmit the higher network layer status PDU (e.g., PDCP status PDU, TCP/IP status PDU, etc.) to base station 1204 indicating Last_Submitted_PDCP_RX_SN+1). In this example, status processing component 1244 can receive the higher network layer status PDU, and can cause second network layer 1260 to refrain from transmitting lower network layer PDUs that correspond to higher network layer PDUs having a sequence number less than FMS. For example, second network layer 1260 can determine whether one or more lower network layer PDUs to be transmitted are related to higher network layer PDUs having a sequence number less than FMS, and can accordingly refrain from transmitting/retransmitting the lower network layer PDUs, delete or flush the lower network layer PDUs, as described, and/or the like. In addition, for example, PDU communicating component 1242 can provide PDUs with sequence numbers of FMS or greater to second network layer 1260, and PDU generating component 1262 can generate lower network layer PDUs from the PDUs from the first network layer 1240 for transmitting to UE 120 via transceiver 1256. Thus, base station 1204 can drop transmission/retransmission of the lower network layer PDUs corresponding to the missing PDUs based on receiving the status PDU from UE 120.

Figure 14:
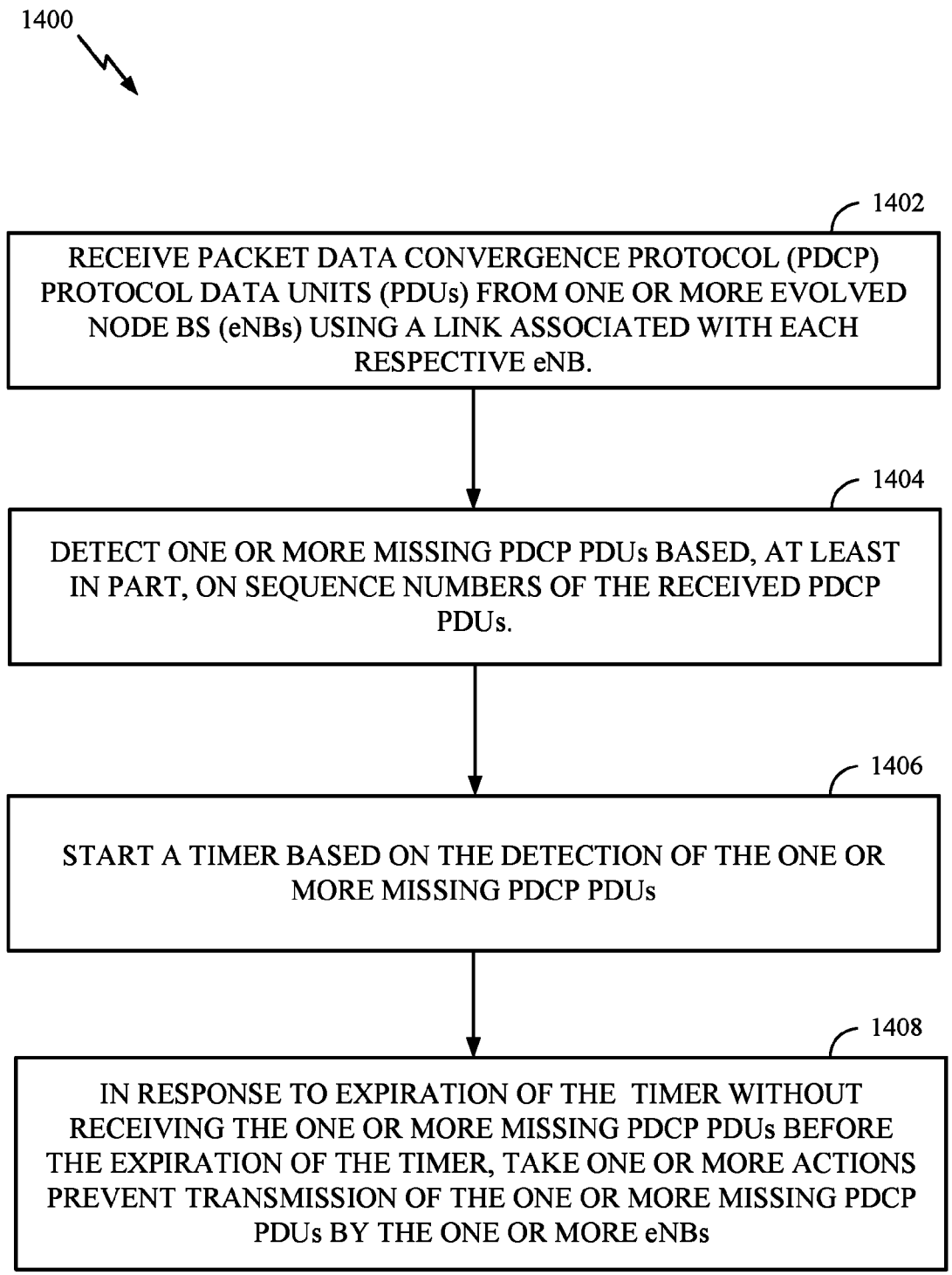
FIG. 14 illustrates example operations performed by a UE, according to aspects of the present disclosure.

FIG. 14 illustrates example operations 1400 for avoiding unnecessary PDCP PDU transmissions, for example, when a PDCP reorder timer expires. Operations 1400 may be performed, for example, by a user equipment (e.g., UE 120).

Operations 1400 begin at 1402 by receiving packet data convergence protocol (PDCP) protocol data units (PDUs) from one or more evolved Node Bs (eNBs) using a link associated with each respective eNB. In an aspect, PDU processing component 1212, e.g., in conjunction with the one or more processors 1203, memory 1205 and/or transceiver 1206, can receive the PDCP PDUs from the one or more eNBs, such as base station 1204, using a link associated with each respective eNB. At 1404, the UE detects one or more missing PDCP PDUs based, at least in part, on sequence numbers of the received PDCP PDUs. In an aspect, PDU reordering component 1214, e.g., in conjunction with the one or more processors 1203, memory 1205 and/or transceiver 1206, can detect the one or more missing PDCP PDUs based, at least in part, on sequence numbers of the received PDCP PDUs. As described, the UE 120 can perform payload inspection to determine sequence numbers, and can detect when there is a gap in received sequence numbers (e.g., when a PDU with a sequence number higher than expected is received). At 1406, the UE starts a timer based on the detection of the one or more missing PDCP PDUs. In an aspect, PDU reordering component 1214, e.g., in conjunction with the one or more processors 1203, memory 1205 and/or transceiver 1206, can start the timer (e.g., reorder timer 1216) based on the detection of the one or more missing PDCP PDUs.

At 1408, in response to expiration of the timer without receiving the one or more missing PDCP PDUs before the expiration of the timer, the UE takes one or more actions prevent transmission of the one or more missing PDCP PDUs by the one or more eNBs. In an aspect, status notifying component 1218, e.g., in conjunction with the one or more processors 1203, memory 1205 and/or transceiver 1206, can, in response to expiration of the timer without receiving the one or more missing PDCP PDUs before the expiration of the timer, take one or more actions to prevent transmission of the one or more missing PDCP PDUs by the one or more eNBs.

As noted above, the UE (e.g., via status notifying component 1218) may take one or more actions to prevent unnecessary transmissions by one or more eNBs of one or more missing PDCP PDUs. For example, when a PDU is sent out of order, the UE may start a reorder timer 1216. Upon expiration of the reorder timer 1216 and execution of standard specified reorder timer expiry processing, the UE may generate a status PDU (e.g., a PDCP status PDU) including an indication of a FMS with a value set to Last_Submitted_PDCP_RX_SN+1 (i.e., the last PDCP PDU SN received by the UE plus one). In the above example used in reference to FIG. 11, the FMS may be set to 16. In one example, base station 1204 or other transmitting node receiving the status PDU may look into lower network layer PDUs (e.g., at second network layer 1260) that are prepared for transmission to the UE 120 and, where the higher network layer PDUs (e.g., at first network layer 1240) have smaller sequence numbers than the FMS, can discard such lower network layer PDUs and refrain from transmitting/retransmitting these PDUs to the UE 120, as described.

Figure 15:
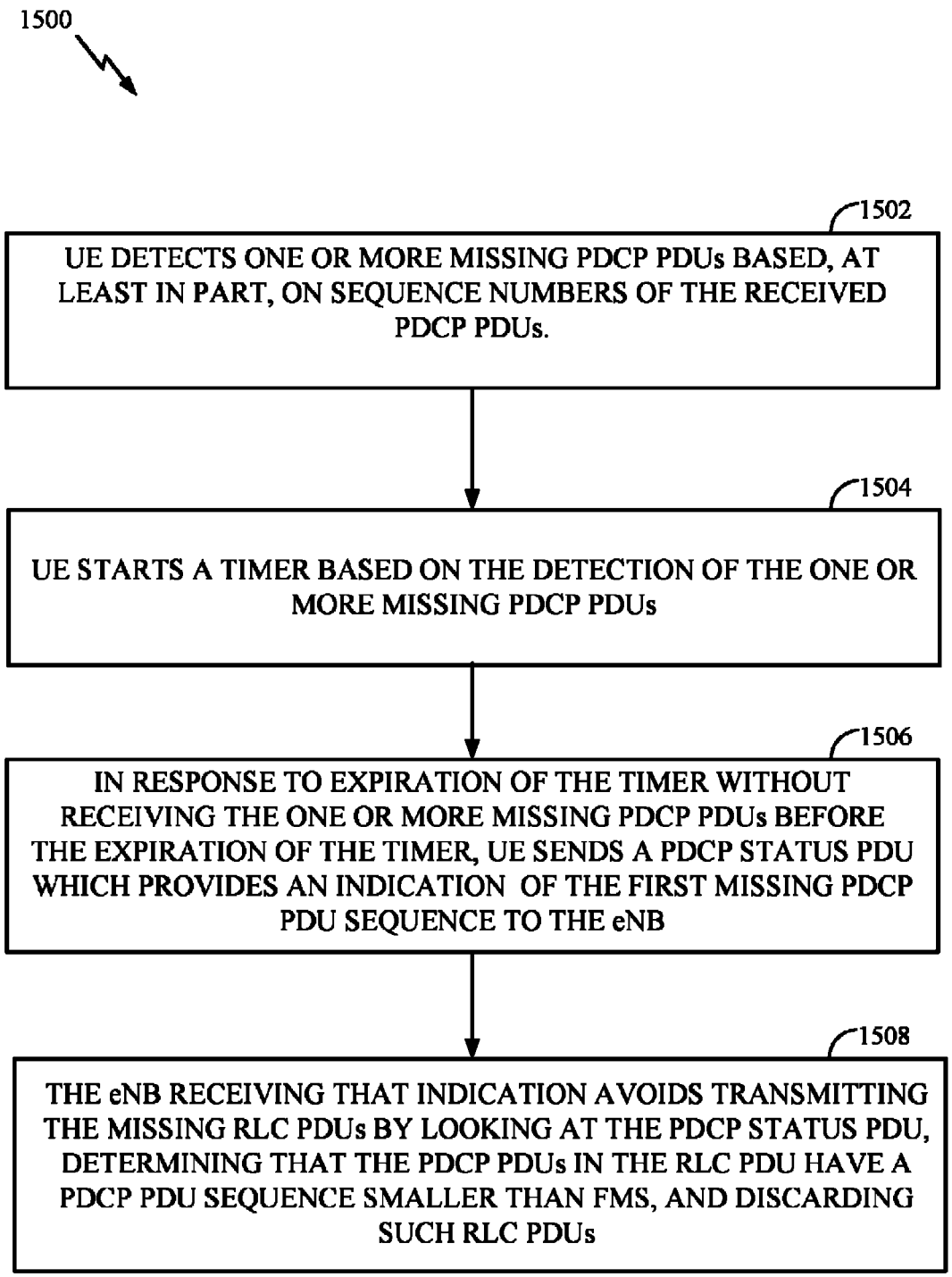
FIG. 15 illustrates example operations for preventing unnecessary transmissions by the eNB by providing a first missing sequence.

FIG. 15 illustrates example operations 1500 for preventing unnecessary transmissions by the eNB. From the UE side, at 1502, the UE detects one or more missing PDCP PDUs based, at least in part, on sequence numbers of the received PDCP PDUs. As described, in an aspect, the PDU reordering component 1214 can detect the missing (or out of order) PDCP PDUs. In addition, at 1504, the UE (e.g., via PDU reordering component 1214) can start a timer (e.g., reorder timer 1216) based on the detection of the one or more missing PDCP PDUs. At 1506, the UE can, in response to expiration of the timer without receiving the one or more missing PDCP PDUs before expiration of the timer, send a PDCP status PDU, which provides an indication of the first missing PDCP PDU sequence, to the eNB. As described, in an aspect, PDCP status notifying component 1218 can send the PDCP status PDU, which provides the indication of the first missing PDCP PDU sequence, to the eNB (e.g., by transmitting the PDCP status PDU or otherwise acknowledging receipt of corresponding lower network layer PDUs, as described), which can be communicated via transceiver 1206 to base station 1204.

At 1508, the eNB receiving that indication in the PDCP status PDU (e.g., base station 1204) may avoid transmitting the missing RLC PDUs by looking at the PDCP status PDU, determine that the PDCP PDUs in the RLC PDU have a PDCP PDU sequence smaller than the FMS, and discard such RLC PDUs. In one specific example, the PDCP PDU sequence can correspond to the lowest bits of PDCP COUNT value, as defined by 3GPP technical specification (TS) 36.323. For example, status processing component 1244 at the first network layer 1240 of base station 1204 can receive the indication from the UE 120, and second network layer 1260 can accordingly determine whether PDCP PDUs in any of the RLC PDUs generated by PDU generating component 1262 and for which transmission is attempted or scheduled to be attempted, have a PDCP PDU sequence smaller than the FMS. If so, PDU generating component 1262 may discard the RLC PDUs such that transmission thereof is avoided. Thus, transmitting/retransmitting of the missing PDCP PDUs is similarly avoided. Moreover, for example, PDU communicating component 1242 can generate subsequent PDUs (e.g., with a sequence number greater than the received FMS), and PDU generating component 1262 can generate related lower network layer PDUs for transmission to the UE 120. Thus, for example, the PDCP status PDU can act as a trigger for avoiding further transmission/retransmission of missing PDCP PDUs or out of order PDCP PDUs, and can inform the base station 1204 what the next expected PDCP PDU is so the base station 1204 may avoid transmitting PDCP PDUs, or related lower network layer PDUs (e.g., RLC PDUs) that are no longer desired at the UE 120.

As discussed above, upon receiving the PDCP status PDU, an eNB may have the option to forego transmitting the PDUs with sequence numbers lower than the FMS (e.g., PDUs with SNs=6, 7, 8, 9 which have not been transmitted on Carrier 2 by Small cell 1104). As described, for example, where PDCP reorder timer 1216 expires, status notifying component 1218 can generate and transmit the PDCP status PDU with FMS to the base station 1204. According to certain aspects, with this approach the eNB's receives the PDCP status PDU (e.g., via status processing component 1244). The eNB's second network layer 1260 (e.g., RLC layer) may perform a payload inspection to figure out the PDCP SNs of its SDUs in the transmission queue and/or retransmission queue of the second network layer 1260, and can accordingly stop transmission/retransmission of these SDUs (e.g., delete or flush the SDUs from the queue(s)). In some examples, status notifying component 1218 can generate a PDCP status PDU based on detecting a handover of UE 120 (e.g., or one or more links thereof) to another base station, access point, related cell, etc. In another example, status notifying component 1218 can generate a PDCP status PDU based on detecting a radio link failure or a state change, e.g., switching to dual connectivity.

Figure 16:
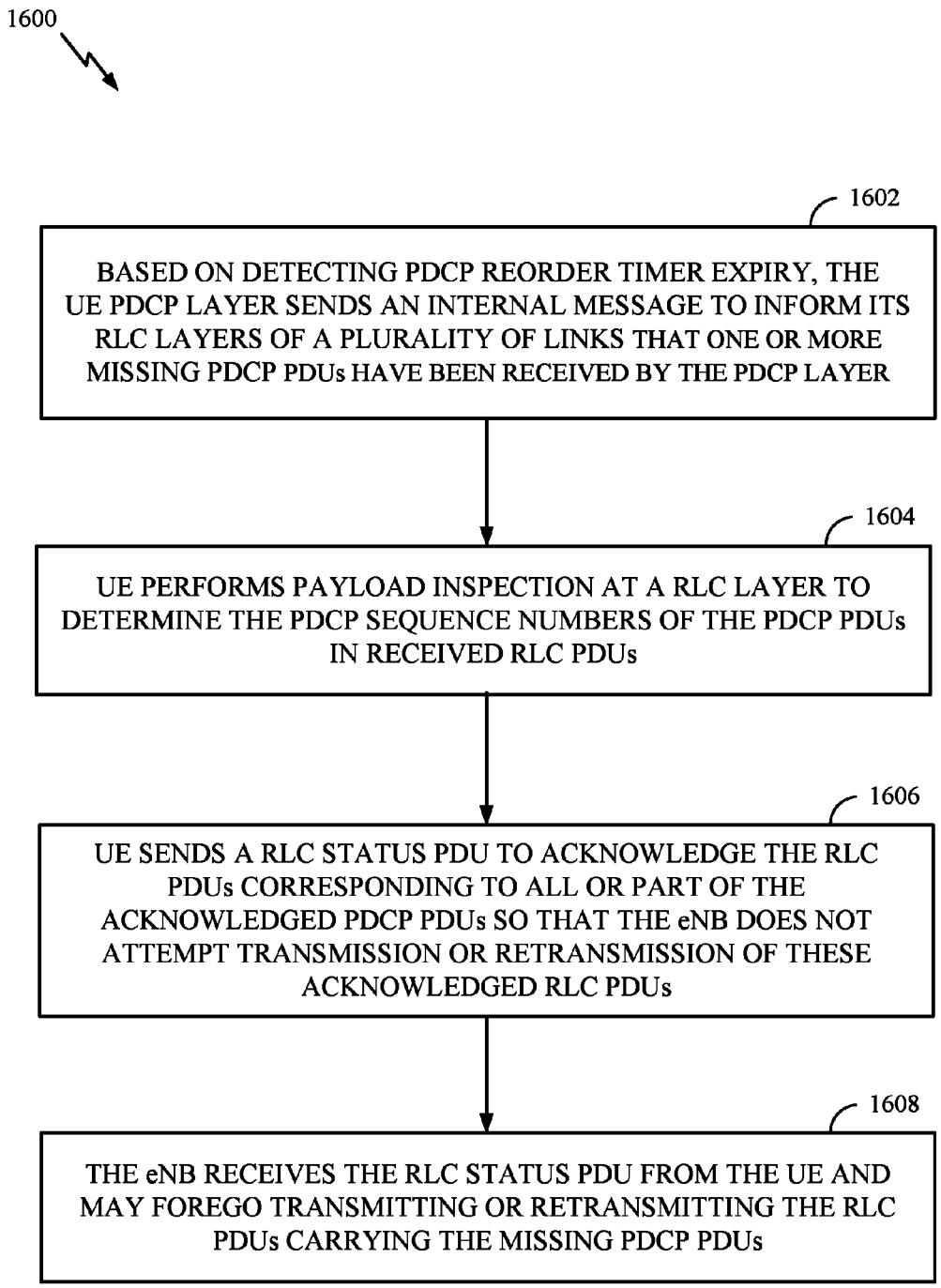
FIG. 16 illustrates example operations for preventing unnecessary transmissions by the eNB by providing a status protocol data unit.

FIG. 16 illustrates other example operations 1600 for preventing unnecessary transmissions by the eNB where taking one or more actions may include, at 1602, the UE PDCP layer, based on detecting PDCP reorder timer expiry, sending an internal message to inform its RLC layers of a plurality of links that one or more missing PDCP PDUs have been received by the PDCP layer. In an aspect, status notifying component 1218 can, based on PDCP reorder timer expiry (e.g., reorder timer 1216), send an internal message (e.g., to second network layer 1220) to inform its RLC layers of a plurality of links that one or more missing PDCP PDUs have been received by the PDCP layer (e.g., first network layer 1210). The PDCP PDUs may no longer be needed or wanted by the UE 120 based on expiry of the corresponding reorder timer. Thus, the RLC layer may refrain from attempting to receive RLC PDUs that include the one or more missing PDUs and/or can accordingly adjust a receive state variable VR(r) used by PDU providing component 1222 for receiving second network layer PDUs from the base station 1204.

In addition, at 1604, the UE can perform payload inspection at the RLC layer to determine the PDCP sequence numbers of the PDCP PDUs in received RLC PDUs. In an aspect, PDU providing component 1222 can perform the payload inspection at the RLC layer (e.g., second network layer 1220) to determine the PDCP sequence numbers of the PDCP PDUs in received RLC PDUs (e.g., as received from base station 1204).

Moreover, for example, at 1606, the UE can send a RLC status PDU to acknowledge the RLC PDUs corresponding to all or part of the acknowledged PDCP PDUs so that the eNB does not attempt retransmission of these acknowledged RLC PDUs. In an aspect, status notifying component 1218 can send the RLC status PDU to acknowledge the RLC PDUs (or other second network layer 1220 PDUs) corresponding to all or part of the acknowledged PDCP PDUs (or other first network layer 1210 PDUs) so that the eNB (e.g., base station 1204) does not attempt transmission or retransmission of these acknowledged RLC PDUs.

Additionally, for example, at 1608, the eNB can receive the RLC status PDU from the UE and may forego transmitting or retransmitting the RLC PDUs carrying the missing PDCP PDUs. In an aspect, status processing component 1264 can receive the RLC status PDU from the UE 120, and PDU generating component 1262 may forego transmitting or retransmitting (or generating) the acknowledged RLC PDUs, which may otherwise carry (e.g., or be associated with) the missing PDCP PDUs.

For example, given the above example, when the PDCP reorder timer expires, the RLC entity/instance associated with Carrier 2 of FIG. 11 may have received an RLC PDU with SN=20 carrying PDCP PDU with SN=9, with all PDCP SNs=0, 1, 2, . . . , 8 missing, probably being retransmitted by the eNB (e.g., Small cell 1104) RLC transmit entity. According to certain aspects, with this approach the UE's RLC layer may perform a payload inspection to figure out the PDCP SNs of its SDUs, at 1604. In this case, the UE RLC entity (e.g., via status processing component 1224) associated with Carrier 2 may generate and transmit an RLC status PDU with acknowledgement (ACK)_SN=21 to the eNB (e.g., Small cell 1104) so that unnecessary RLC PDU transmission or retransmission can be avoided. For example, when the RLC status PDU with ACK_SN=21 is received at the eNB (e.g., via status processing component 1264 of Small cell 1104), the eNB may accordingly determine that all RLC PDUs with RLC SNs up to 20 have been successfully received by the UE, thus resulting in the eNB not transmitting or retransmitting these missing and unneeded RLC PDUs even though in reality these RLC PDUs may not have been successfully received at the UE 120.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

According to certain aspects, such means may be implemented by processing systems configured to perform the corresponding functions by implementing various algorithms (e.g., in hardware or by executing software instructions) described above. For example, an algorithm for determining a maximum available transmit power of the UE, an algorithm for semi-statically configuring a first minimum guaranteed power available for uplink transmission to a first base station and a second minimum guaranteed power available for uplink transmission to a second base station, and an algorithm for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a UE 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a receiving node, comprising:
   receiving protocol data units (PDUs) at a network layer from one or more transmitting nodes using a link associated with each respective transmitting node;
   detecting one or more missing PDUs based, at least in part, on sequence numbers of the received PDUs;
   starting a timer based on the detection of the one or more missing PDUs; and
   in response to expiration of the timer, and without receiving the one or more missing PDUs before the expiration of the timer, notifying a lower network layer that the one or more missing PDUs are received.

2. The method of claim 1, wherein notifying to the lower network layer comprises acknowledging receipt of the one or more missing PDUs to the lower network layer.

3. The method of claim 1, wherein notifying to the lower network layer comprises transmitting a lower network layer status message to the transmitting node to prevent the transmitting node transmitting lower network layer PDUs corresponding to the one or more missing PDUs.

4. The method of claim 1, wherein notifying to the lower network layer comprises notifying to a plurality of lower network layers, wherein each of the plurality of lower network layers corresponds to the link associated with each respective transmitting node.

5. The method of claim 1, wherein the one or more missing PDUs are packet data convergence protocol (PDCP) PDUs, and wherein the lower network layer is a radio link control (RLC) layer.

6. The method of claim 1, wherein the one or more missing PDUs are transmission control protocol (TCP), internet protocol (IP), TCP/IP, or user datagram protocol (UDP) PDUs, and wherein the lower network layer is a packet data convergence protocol (PDCP) layer or a radio link control (RLC) layer.

7. The method of claim 1, further comprising:
transmitting, to the one or more transmitting nodes, a status message formed at the network layer that receives data from each link associated with each respective transmitting node, wherein the status message includes an indication of a first missing sequence (FMS), wherein the FMS is selected to prevent transmission of the one or more missing PDUs by the one or more transmitting nodes.

8. An apparatus for wireless communication by a receiving node, comprising:
a transceiver;
a memory; and
at least one processor communicatively coupled with the transceiver and the memory, wherein the at least one processor is configured to:
receive protocol data units (PDUs) at a network layer from one or more transmitting nodes using a link associated with each respective transmitting node;
detect one or more missing PDUs based, at least in part, on sequence numbers of the received PDUs;
start a timer based on the detection of the one or more missing PDUs; and
in response to expiration of the timer, and without receiving the one or more missing PDUs before the expiration of the timer, notify a lower network layer that the one or more missing PDUs are received.

9. The apparatus of claim 8, wherein the at least one processor is configured to notify to the lower network layer at least in part by acknowledging receipt of the one or more missing PDUs to the lower network layer.

10. The apparatus of claim 8, wherein the at least one processor is configured to notify to the lower network layer at least in part by transmitting a lower network layer status message to the transmitting node to prevent the transmitting node transmitting lower network layer PDUs corresponding to the one or more missing PDUs.

11. The apparatus of claim 8, wherein the at least one processor is configured to notify to the lower network layer at least in part by notifying to a plurality of lower network layers, wherein each of the plurality of lower network layers corresponds to the link associated with each respective transmitting node.

12. The apparatus of claim 8, wherein the one or more missing PDUs are packet data convergence protocol (PDCP) PDUs, and wherein the lower network layer is a radio link control (RLC) layer.

13. The apparatus of claim 8, wherein the one or more missing PDUs are transmission control protocol (TCP), internet protocol (IP), TCP/IP, or user datagram protocol (UDP) PDUs, and wherein the lower network layer is a packet data convergence protocol (PDCP) layer or a radio link control (RLC) layer.

14. The apparatus of claim 8, wherein the at least one processor is further configured to transmit, to the one or more transmitting nodes, a status message formed at the network layer that receives data from each link associated with each respective transmitting node, wherein the status message includes an indication of a first missing sequence (FMS), wherein the FMS is selected to prevent transmission of the one or more missing PDUs by the one or more transmitting nodes.

15. The apparatus of claim 8, further comprising one or more antennas coupled to the transceiver and configured to at least one of transmit one or more wireless signals to the transmitting node or receive one or more wireless signals from the transmitting node.

16. An apparatus for wireless communication by a user equipment (UE), comprising:
means for receiving protocol data units (PDUs) at a network layer from one or more transmitting nodes using a link associated with each respective transmitting node;
means for detecting one or more missing PDUs based, at least in part, on sequence numbers of the received PDUs;
means for starting a timer based on the detection of the one or more missing PDUs; and
means for, in response to expiration of the timer, and without receiving the one or more missing PDUs before the expiration of the timer, notifying a lower network layer that the one or more missing PDUs are received.

17. The apparatus of claim 16, wherein the means for notifying notifies to the lower network layer at least in part by acknowledging receipt of the one or more missing PDUs to the lower network layer.

18. The apparatus of claim 16, wherein the means for notifying notifies to the lower network layer at least in part by transmitting a lower network layer status message to the transmitting node to prevent the transmitting node transmitting lower network layer PDUs corresponding to the one or more missing PDUs.

19. The apparatus of claim 16, wherein the means for notifying notifies to the lower network layer at least in part by notifying to a plurality of lower network layers, wherein each of the plurality of lower network layers corresponds to the link associated with each respective transmitting node.

20. The apparatus of claim 16, wherein the one or more missing PDUs are packet data convergence protocol (PDCP) PDUs, and wherein the lower network layer is a radio link control (RLC) layer.

21. The apparatus of claim 16, wherein the one or more missing PDUs are transmission control protocol (TCP), internet protocol (IP), TCP/IP, or user datagram protocol (UDP) PDUs, and wherein the lower network layer is a packet data convergence protocol (PDCP) layer or a radio link control (RLC) layer.

22. The apparatus of claim 16, further comprising means for transmitting, to the one or more transmitting nodes, a status message formed at the network layer that receives data from each link associated with each respective transmitting node, wherein the status message includes an indication of a first missing sequence (FMS), wherein the FMS is selected to prevent transmission of the one or more missing PDUs by the one or more transmitting nodes.

23. The apparatus of claim 16, wherein the means for receiving comprises one or more antennas coupled to a transceiver and configured to at least one of transmit one or more wireless signals to the transmitting node or receive one or more wireless signals from the transmitting node.

24. A computer-readable medium storing computer executable code for wireless communication by a user equipment (UE), the code comprising:
- code for receiving protocol data units (PDUs) at a network layer from one or more transmitting nodes using a link associated with each respective transmitting node;
- code for detecting one or more missing PDUs based, at least in part, on sequence numbers of the received PDUs;
- code for starting a timer based on the detection of the one or more missing PDUs; and
- code for, in response to expiration of the timer, and without receiving the one or more missing PDUs before the expiration of the timer, notifying a lower network layer that the one or more missing PDUs are received.

25. The computer-readable medium of claim 24, wherein the code for notifying notifies to the lower network layer at least in part by acknowledging receipt of the one or more missing PDUs to the lower network layer.

26. The computer-readable medium of claim 24, wherein the code for notifying notifies to the lower network layer at least in part by transmitting a lower network layer status message to the transmitting node to prevent the transmitting node transmitting lower network layer PDUs corresponding to the one or more missing PDUs.

27. The computer-readable medium of claim 24, wherein the code for notifying notifies to the lower network layer at least in part by notifying to a plurality of lower network layers, wherein each of the plurality of lower network layers corresponds to the link associated with each respective transmitting node.

28. The computer-readable medium of claim 24, wherein the one or more missing PDUs are packet data convergence protocol (PDCP) PDUs, and wherein the lower network layer is a radio link control (RLC) layer.

29. The computer-readable medium of claim 24, wherein the one or more missing PDUs are transmission control protocol (TCP), internet protocol (IP), TCP/IP, or user datagram protocol (UDP) PDUs, and wherein the lower network layer is a packet data convergence protocol (PDCP) layer or a radio link control (RLC) layer.

30. The computer-readable medium of claim 24, further comprising code for transmitting, to the one or more transmitting nodes, a status message formed at the network layer that receives data from each link associated with each respective transmitting node, wherein the status message includes an indication of a first missing sequence (FMS), wherein the FMS is selected to prevent transmission of the one or more missing PDUs by the one or more transmitting nodes.

* * * * *